(12) United States Patent
Gosselin

(10) Patent No.: US 9,568,074 B2
(45) Date of Patent: Feb. 14, 2017

(54) MOTION TRANSMITTING DEVICE WITH EPICYCLIC REDUCTION GEARING, EPICYCLIC REDUCTION GEARING AND MANIPULATING ARM

(71) Applicant: COMMISSARIAT A L'ENERGIE ATOMIQUE ET AUX ENERGIES ALTERNATIVES, Paris (FR)

(72) Inventor: Florian Gosselin, Vanves (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 114 days.

(21) Appl. No.: 14/413,797

(22) PCT Filed: Jul. 1, 2013

(86) PCT No.: PCT/EP2013/063830
§ 371 (c)(1),
(2) Date: Jan. 9, 2015

(87) PCT Pub. No.: WO2014/009192
PCT Pub. Date: Jan. 16, 2014

(65) Prior Publication Data
US 2015/0167798 A1     Jun. 18, 2015

(30) Foreign Application Priority Data
Jul. 11, 2012 (FR) ..................................... 12 56690

(51) Int. Cl.
*F16H 19/06*     (2006.01)
*B25J 9/10*      (2006.01)
(Continued)

(52) U.S. Cl.
CPC ............... *F16H 19/06* (2013.01); *B25J 9/102* (2013.01); *B25J 9/104* (2013.01); *B25J 9/1045* (2013.01);
(Continued)

(58) Field of Classification Search
CPC ... F16H 19/08; F16H 2019/085; B25T 9/1045
See application file for complete search history.

(56) References Cited

U.S. PATENT DOCUMENTS 4,766,775 A * 8/1988 Hodge ..................... B25J 9/08
                                                    403/13
5,640,883 A * 6/1997 Takizawa ................. B25J 9/044
                                                    74/490.04
(Continued)

FOREIGN PATENT DOCUMENTS

EP       0 612 934 A2     8/1994

OTHER PUBLICATIONS

International Search Report for PCT/EP2013/063830 dated Jul. 26, 2013.

*Primary Examiner* — Justin Holmes
*Assistant Examiner* — Lillian Nguyen
(74) *Attorney, Agent, or Firm* — Sughrue Mion, PLLC

(57) ABSTRACT

A device for transmitting motion between a motor (8, 8a) and a mobile element, comprising an epicyclic reduction gearing with a first sun wheel (2.1) and a second sun wheel (2.2), coaxial to each other and connected by transmission means to at least one first planet wheel (3.1) and a second planet wheel (3.2) respectively, which are carried coaxially to each other by a planet carrier (5) mounted to pivot eccentrically around the axis of the sun wheels, characterized in that the transmission means comprise flexible transmission elements (6a, 7a) wound respectively around the first sun wheel and the first planet wheel, and around the second sun wheel and the second planet wheel.

(Continued)

Epicyclic reduction gearing and manipulation arm comprising such a device.

38 Claims, 26 Drawing Sheets

(51) Int. Cl.
    *F16H 19/00*     (2006.01)
    *F16H 19/08*     (2006.01)

(52) U.S. Cl.
    CPC ............ *F16H 19/005* (2013.01); *F16H 19/08* (2013.01); *F16H 2019/085* (2013.01); *Y10T 74/20323* (2015.01)

(56) References Cited

U.S. PATENT DOCUMENTS

| | | | |
|---|---|---|---|
| 6,902,560 | B1 | 6/2005 | Morley et al. |
| 2003/0125158 | A1* | 7/2003 | Flamang ................ F16C 25/08 475/331 |
| 2008/0229862 | A1* | 9/2008 | Nakamoto ............ B25J 9/1045 74/490.04 |
| 2010/0259057 | A1* | 10/2010 | Madhani ............ B25J 15/0009 294/106 |
| 2011/0167946 | A1* | 7/2011 | Kim ........................ B25J 9/103 74/490.04 |
| 2013/0090194 | A1* | 4/2013 | Ferlay .................... B25J 9/104 474/64 |
| 2014/0070515 | A1* | 3/2014 | Maerkze ................ A61G 5/023 280/253 |

\* cited by examiner

MOTION TRANSMITTING DEVICE WITH EPICYCLIC REDUCTION GEARING, EPICYCLIC REDUCTION GEARING AND MANIPULATING ARM

CROSS REFERENCE TO RELATED APPLICATIONS

This application is a National Stage of International Application No. PCT/EP2013/063830 filed Jul. 1, 2013, claiming priority based on French Patent Application No. 12 56690 filed Jul. 11, 2012, the contents of all of which are incorporated herein by reference in their entirety.

The present invention concerns a motion transmitting device with an epicyclic reduction gearing which can be used on interfaces intended particularly for robotic, cobotic and haptic applications. The object of the invention is also an epicyclic reduction gearing and a manipulating arm for such applications.

Robots and haptic interfaces consist of poly-articulated mechanical chains and are generally actuated by electric motors. Their performance is directly linked to the quality of the devices transmitting the motion and force, which in particular connect each segment actuated by the mechanical chain to the motor associated with said segment.

The transmission devices pose two problems limiting their performance: loss of energy, in particular by friction, and operating play. In transmission devices comprising a reduction gearing, these phenomena become more pronounced as the reduction ratio increases, such that the higher the reduction ratio, the lower the efficiency.

In the field of industrial robots, there are reasonably satisfactory solutions for obtaining reduction gearing with a high reduction ratio.

These solutions include amongst others:
belt-driven reduction gear mechanisms, which however require several stages to achieve a high reduction ratio, and therefore take up a very considerable space;
toothed gear mechanisms, in particular epicyclic reduction gear mechanisms, which however require several stages to obtain high reduction ratios, such a reduction gearing then having a relatively high inertia and substantial operating play and/or friction levels harmful to its efficiency;
the wheel and endless screw assembly, which allows very high reduction ratios but is not reversible;
reduction gear mechanisms in which an internal, elliptical, pivoting element brings some teeth of a flexible ring into contact with an outer ring having a slightly different number of teeth. Thus the flexible ring turns slightly in relation to the outer ring as the elliptical element rotates, wherein these reduction gear mechanisms allow high reduction ratios but with considerable friction, limiting their efficiency.

Although said drawbacks constitute a problem, they are acceptable in the industrial robotic applications but more often become extremely problematic in the field of haptic or cobotic applications.

Thus in haptic interfaces and in robots acting in cooperation with man (currently known as cobots), an additional constraint is that the system must be reversible (i.e. it can be actuated at the input, the motor then moving the actuated segment which is gripped by the user, or at the output, the user then moving the actuated segment which in turn drives the motor) and transparent (low friction and low play).

The majority of existing reduction gear mechanisms used in the industrial domain do not have this characteristic, such that they must be adapted for haptic and cobotic applications without however achieving the desired performance.

Specific reduction gear mechanisms have therefore been developed for haptic interfaces and for cobotic applications.

The best known and most commonly used is the cable capstan. The reduction ratio is given directly by the ratio between the diameter of the carried pulley and that of the leading pulley, these diameters being calculated to the neutral fiber of the cable connecting them. The diameter of the leading pulley is limited by the winding capacity of the cable, and allows a lower boundary typically of the order of 10 mm for normal cables. To obtain a higher reduction ratio, the diameter of the carried pulley must then be increased, which quickly becomes bulky. Such a solution is not possible if a compact system is to be retained. This solution is not therefore suitable for obtaining a high reduction ratio.

Other systems are also used on certain interfaces, in particular:
pulley block reduction gear mechanisms, which however have a limited reduction ratio, are very complex and relatively bulky;
ball-screw reduction gear mechanisms, which use complex components.

To obtain greater reduction ratios therefore reduction gearing must always be used with several stages, the efficiency of which diminishes.

Thus there is no device for transmitting motion and force with a high reduction ratio, which remains reversible, takes up relative little space and has a relatively simple construction.

One aim of the invention is to provide a motion-transmitting device which is able to resolve at least some of the above disadvantages.

To this end, according to the invention, a device is provided for transmitting motion between a motor and a mobile element, comprising an epicyclic reduction gearing with a first sun wheel and a second sun wheel, coaxial to each other and connected by transmission means to at least one first planet wheel and a second planet wheel respectively, which are carried coaxially to each other by a planet carrier mounted to pivot eccentrically around the axis of the sun wheels, characterized in that the transmission means comprise flexible transmission elements wound respectively around the first sun wheel and the first planet wheel, and around the second sun wheel and the second planet wheel.

Thus the epicyclic reduction gearing of the invention is used in differential mode with a reduction ratio resulting from the differences existing between the diameters of the sun wheels and the planet wheels. The reduction gearing of the invention can be adapted to: allow, with a single reduction stage, a relatively high fixed reduction ratio; be reversible (the input and output of the reduction gearing can be reversed); have a high efficiency (typically of the order of 85% to 90% in both directions) which does not depend on the reduction ratio (low or even zero play and little friction); have a compact structure based on components which are simple to produce. Also the apparent interlock rigidity may be very high at the articulation between the two segments, taking into account the high reduction ratio. Finally, it is possible to distance the motor in order to actuate the device remotely. In this case the rapid strand ensures transmission, while reduction is performed at or close to the output and may be placed on the articulation, which is favorable for performance.

A further object of the invention is an epicyclic reduction gearing for such a device.

Finally the invention concerns an arm equipped with at least one such transmission device.

Other characteristics and advantages of the invention will appear from reading the description which follows of particular, non-limitative embodiments of the invention.

Reference is made to the attached drawings, in which.

Figure 1:
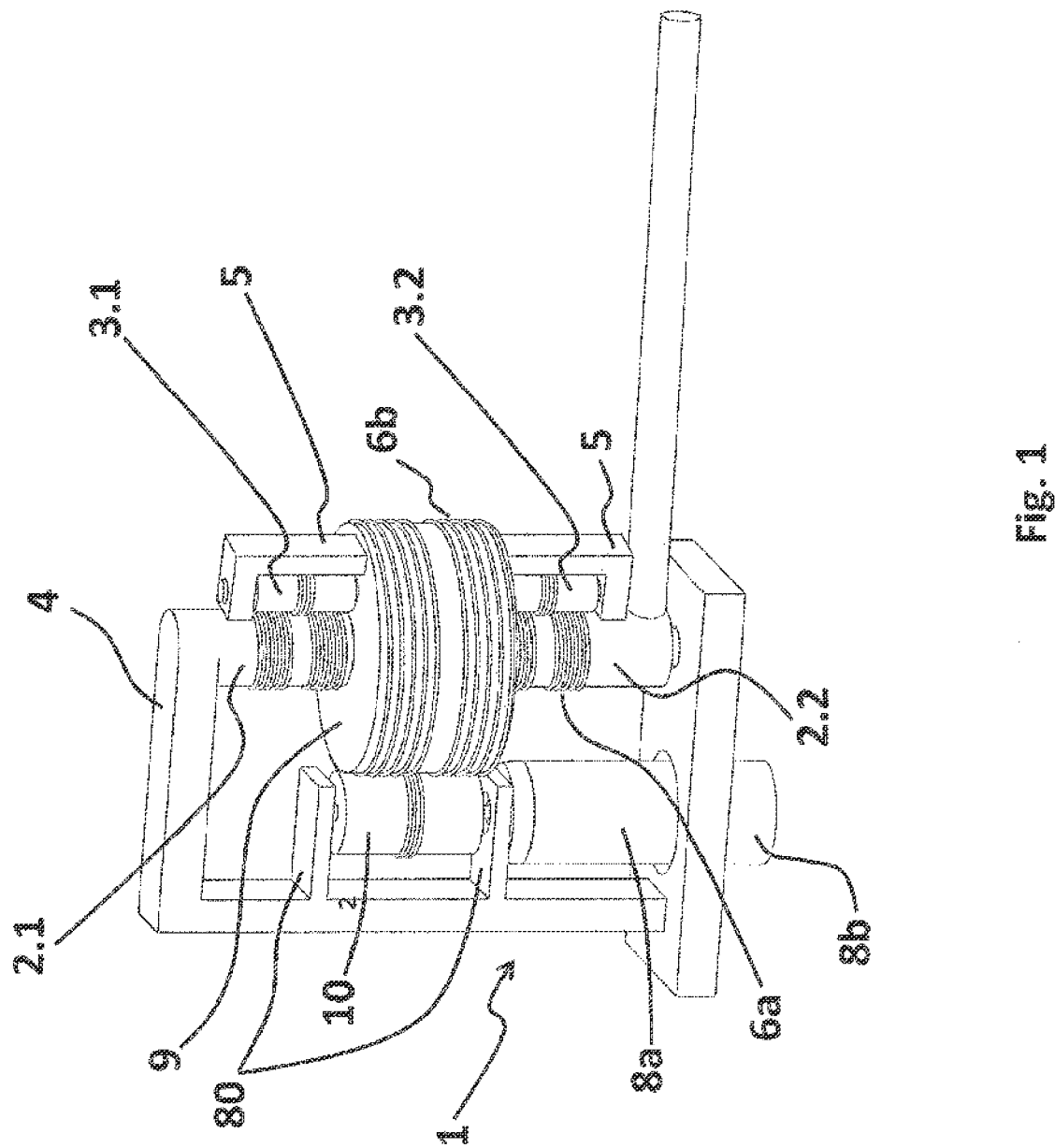
FIG. 1 is a diagrammatic, perspective view of a transmission device according to a first embodiment of the invention with cables.

With reference to the figures, the motion transmitting device of the invention is intended to be mounted between a motor and a mobile element, in order to transmit motion and force from one to the other.

The motor and/or the mobile element are advantageously fitted with position and/or movement measurement means such as encoders or other position sensors allowing measurement, in a manner known in itself, of the movements of the motor and/or mobile element.

On a robot which allows performance of tasks at least partially autonomously, this position sensor allows control of the configuration of the robot and its trajectory in position or force as a function of the task to be performed.

On a haptic interface which allows an individual to interact with a virtual environment or remotely control a robot, these sensors allow measurement of the movement of the articulations of the robot which will be used to calculate the movements of the user, which are in turn used to control the remote robot or a virtual avatar after any filtering. The motors themselves are used in return to apply a reaction to the user, for example by applying a force to him or by resisting his movements.

Finally on a cobot, the motors and position sensors are used to ensure both these functions.

These measurement means are known in themselves and are not therefore described in detail here.

The transmission device, generally designated 1, comprises a support frame 4 on which an epicyclic reduction gearing is mounted, here of the type with sun wheels with external drive, comprising a first sun wheel 2.1 and a second sun wheel 2.2 coaxial with each other and connected by transmission means to at least one first planet wheel 3.1 and a second planet wheel 3.2 respectively, which are carried coaxially to each other by a planet carrier 5. The planet carrier 5 is mounted on the support frame 4 in order to drive the planet wheels 3.1, 3.2 in an eccentric rotational movement around the axis of the sun wheels 2.1, 2.2.

According to the invention, the transmission means comprise flexible transmission elements wound respectively around the first sun wheel 2.1 and the first planet wheel 3.1, and around the second sun wheel 2.2 and the second planet wheel 3.2.

In the embodiments shown in FIGS. 1 to 24, the flexible transmission elements are cables 6a (6a1', 6a2', 6a1", 6a2") each having at least one portion wound around the sun wheels 2.1, 2.2 and one portion wound around the planet wheels 3.1, 3.2.

Figure 25:
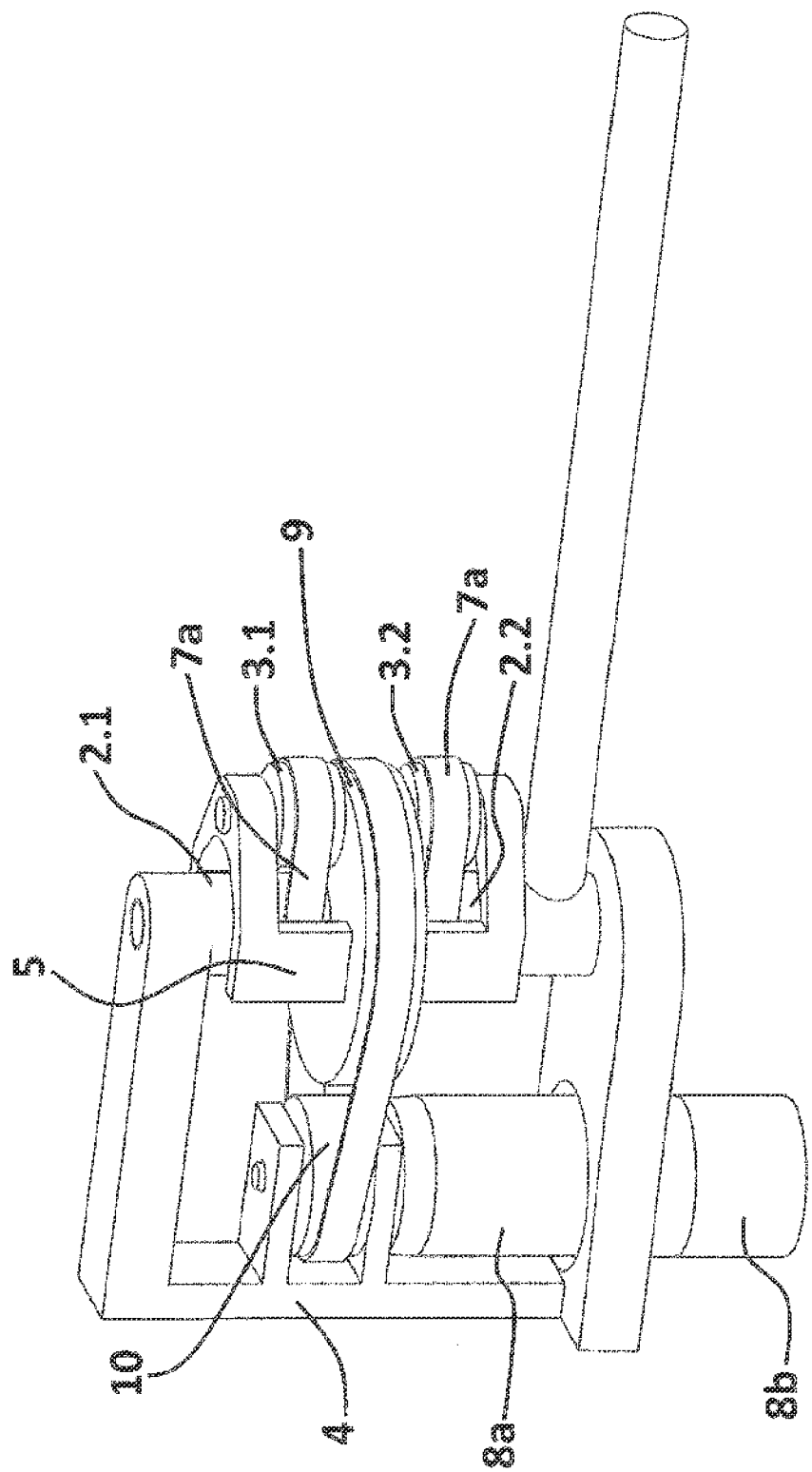
FIG. 25 is a perspective view of a transmission device according to an embodiment of the invention using belts.
Figure 26:
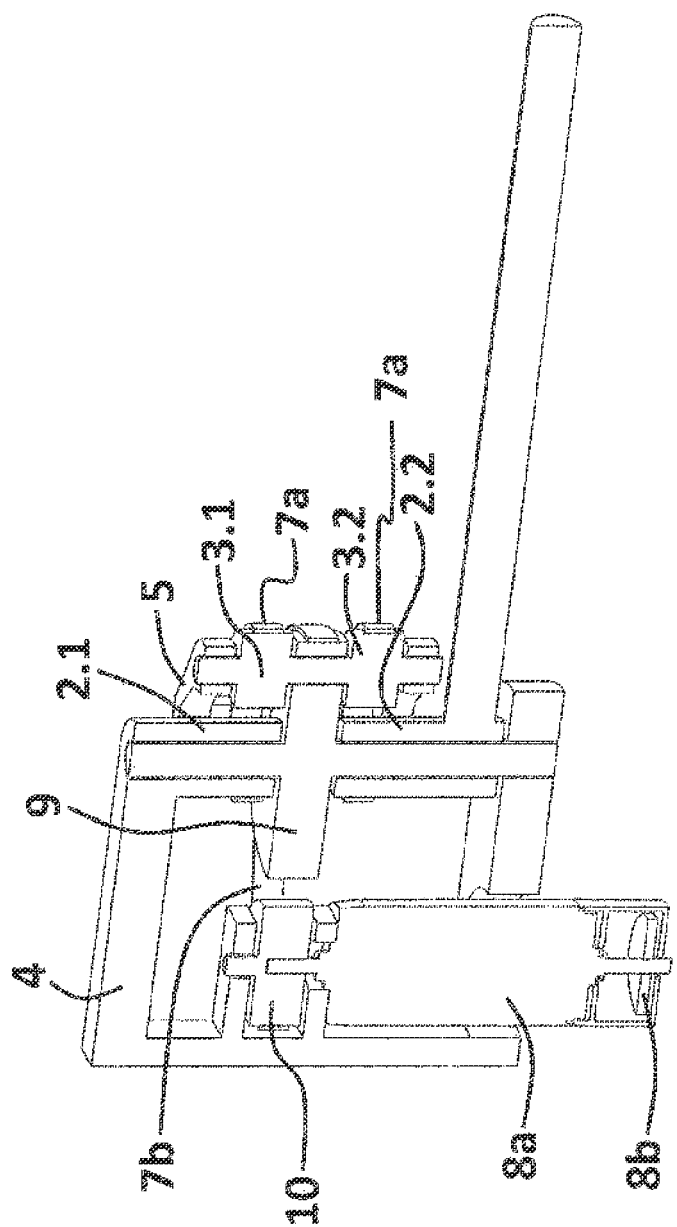
FIG. 26 is a section view of this device for transmission by belts.

In the embodiment of FIGS. 25, 26, the flexible transmission elements are belts 7a.

Figure 2:
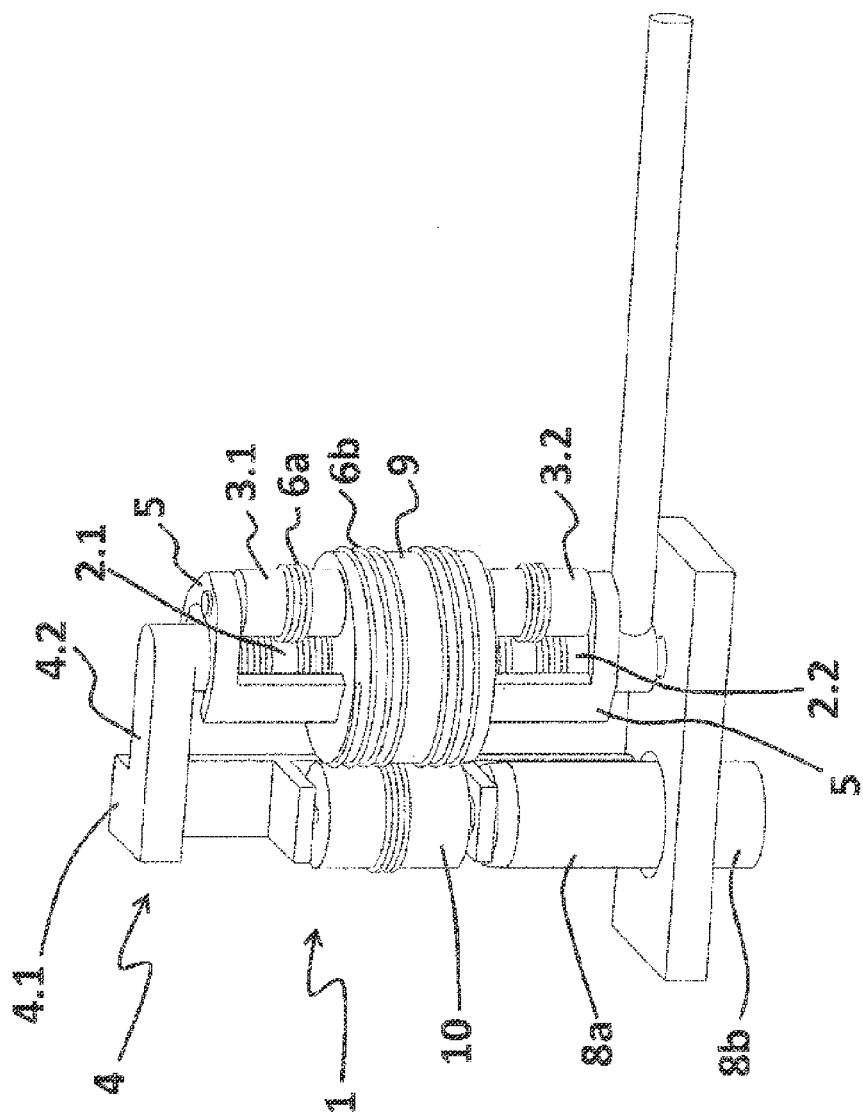
FIG. 2 is a view similar to FIG. 1 of a device according to a variant of a first embodiment.

With reference to FIGS. 1 and 2 and in accordance with the first embodiment of the transmission device according to the invention, the first sun wheel 2.1 is fixed in rotation relative to the support frame 4 while the second sun wheel 2.2 is linked to the mobile element.

The planet carrier 5 is linked to an output shaft of a motor 8a so as to be driven in rotation thereby around the axis of the sun wheels 2.1, 2.2. More precisely, the planet carrier 5 is integral with a pulley mounted to pivot around the sun wheels 2.1, 2.2 and linked to a pulley 10 integral with the output shaft of the motor 8a by a flexible transmission element, namely a cable 6b. The motor 8a is fitted with an encoder 8b which allows measurement of its rotation and control of the system accordingly. It is mounted on a plate 80. This plate could advantageously be mounted moveably on the support frame 4 to be able to pivot around an axis parallel to the axis of the output shaft, so as to allow adjustment of the distance between the motor output shaft and the planet carrier pulley 9. This would allow a tension of the cable 6b linking the pulley 10 of the output shaft of the motor 8a to the planet carrier pulley 9. Such a device is known in itself to the person skilled in the art and is not shown on FIGS. 1 and 2.

The planet wheels 3.1, 3.2 are fixed to a shaft, the central part of which is held pivoting in the pulley 9 of the planet carrier 5. The planet carrier 5 here comprises, for each planet wheel 3.1, 3.2, an L-shaped arm extending axially protruding from the pulley 9, to receive in a pivoting fashion the free end of the shaft carrying the planet wheels 3.1, 3.2, such that each planet wheel 3.1, 3.2 is held between a free end of the arm and the planet carrier pulley 9 and is therefore guided at each of its ends to bear the forces applied to it, while extending between the arm and the corresponding sun wheel.

To ensure a compact structure of the transmission device, the pulley 10 is arranged directly adjacent to the pulley 9 of the planet carrier 5, and the planet wheels 3.1, 3.2 are arranged directly adjacent to the sun wheels 2.1, 2.2.

Also, in order for their winding diameter to be constant, cables 6b, 6a are advantageously helically wound on the pulleys 9, 10, on sun wheels 2.1, 2.2 and on planet wheels 3.1, 3.2. On operation of the device, the cables advance on these pulleys (the term "pulleys" used here in a general sense without numerical reference designates pulleys 9, 10, sun wheels 2.1, 2.2 and planet wheels 3.1, 3.2), i.e. their distance from the end faces of these pulleys varies. Consequently the pulleys must have sufficient size to allow the device the desired travel. The pitch of these helices is also advantageously a function of the diameters of these pulleys, so that the advance of the cables on each of the pulleys, facing each other, of these pairs of pulleys is identical.

A numerical example is given below purely for information. Planet wheels 3.1, 3.2 have radii $R_{S1}=R_{S2}=5.4$ mm, the first sun wheel 2.1 has a radius $R_{P1}=9.65$ mm and the second sun wheel 2.2 a radius $R_{P2}=9.9$ mm. These radii are calculated considering that the cables 6 have a diameter of 0.57 mm (unsheathed) and a diameter of 0.8 mm (sheathed). The planet carrier pulley 9 has radius $R_{PS}=30.4$ mm and pulley 10 of the output shaft of motor 8 has radius $R_m=10.4$ mm. We then have a reduction ratio r1=30.4/10.4=2.92, and a total reduction of $R=r1\times 1/[1-(R_{p1}\times R_{s2})/(R_{s1}\times R_{p2})]=115.75$. Taking into account the height of the pulley 10, the travel at the motor 8a is of the order of 30 turns (±15 turns) or 0.26 turns or almost 93.3° at the output (±46.6°).

It is noted on these figures that cables 6a and 6b are crossed in order to be used in capstan form (contiguous pulleys turn in opposing directions). Cables 6a and/or 6b could also be used without crossing (contiguous pulleys turn in the same direction), in all embodiments.

In the variant of FIG. 2, the support frame 4 comprises two parts 4.1, 4.2 fixed to each other to form an L shape.

Motor 8a carrying the pulley 10 is mounted on part 4.1, and the assembly of sun wheels 2.1, 2.2, planet carrier 5 and planet carrier pulley 9 is mounted on part 4.2 to extend laterally in relation to the motor 8a and the pulley 10.

Also for each planet wheel, the planet carrier 5 comprises a frame extending axially protruding from the pulley 9 of the planet carrier 5 such that each planet wheel is guided between the free end of the frame and the planet carrier pulley 9, and that the sides of the frame extend laterally in relation to the sun wheel—planet wheel pair.

More precisely, the sides of the frame here extend facing the sun wheel and are connected by a yoke extending in a plane perpendicular to the axis of the sun wheel, to surround a portion of the circumference of the sun wheel and carry an end of the planet wheel. The sides of the frame thus extend into a portion clear of the pulley 9 of the planet carrier, and the planet wheel can have its end opposite the yoke held close to the outer circumference of the planet carrier pulley. Each planet wheel 3.1, 3.2 thus extends laterally in relation to the planet carrier 5.

This allows limitation of the radial dimensions of the planet carrier 5, moving it away from the support frame 4, the motor 8a and the pulley 10. This allows limitation of the diameter of the pulley 9 of the planet carrier 5, and brings the assembly of the planet carrier 5 and pulley 9 closer to the support frame 4, motor 8a and pulley 10 in the same proportions without the risk of creating collisions between these assemblies.

This configuration and the L-shape of the support frame 4 allow this variant of the first embodiment to be more compact than the first embodiment shown in FIG. 1.

Figure 3:
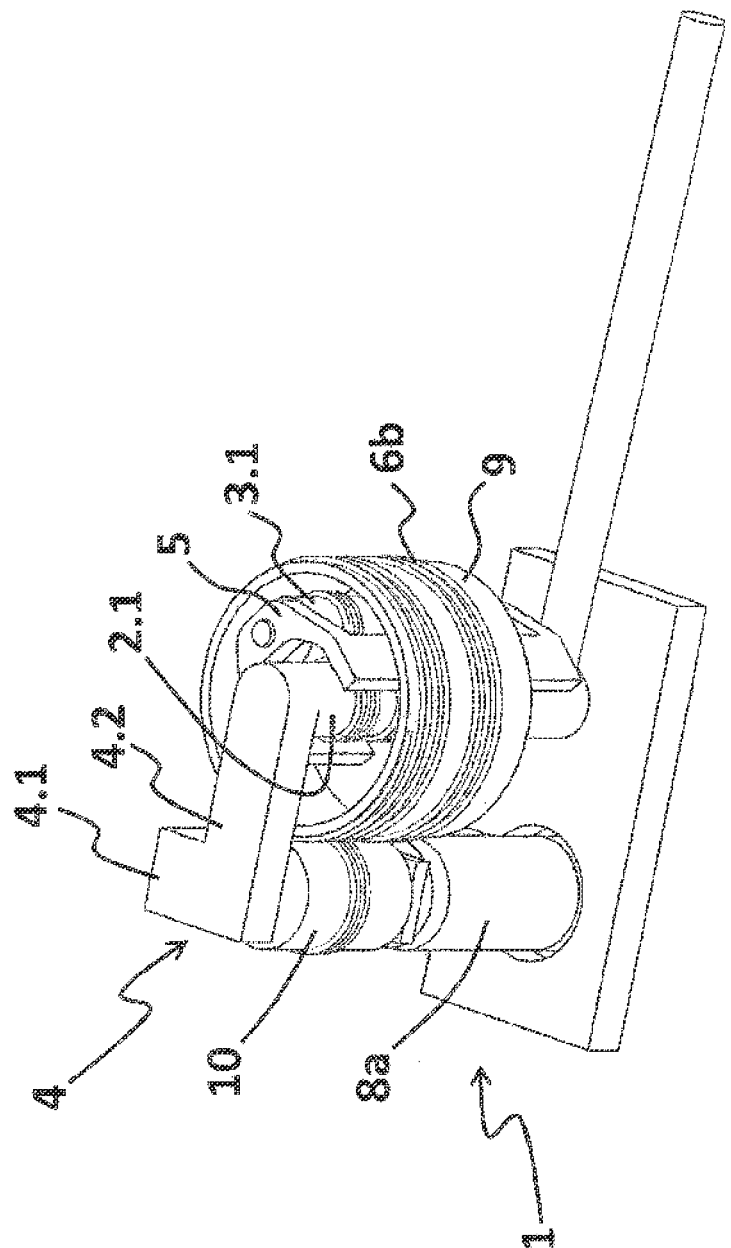
FIG. 3 is a diagrammatic, perspective view of a transmission device according to a second embodiment with cables.

With reference to FIG. 3, the transmission device according to the second embodiment is distinguished from that of the variant of the first embodiment shown in FIG. 2 in that the planet carrier 5 and the planet wheels 3.1, 3.2 are housed at least partially inside the pulley 9 of the planet carrier 5.

Figure 4:
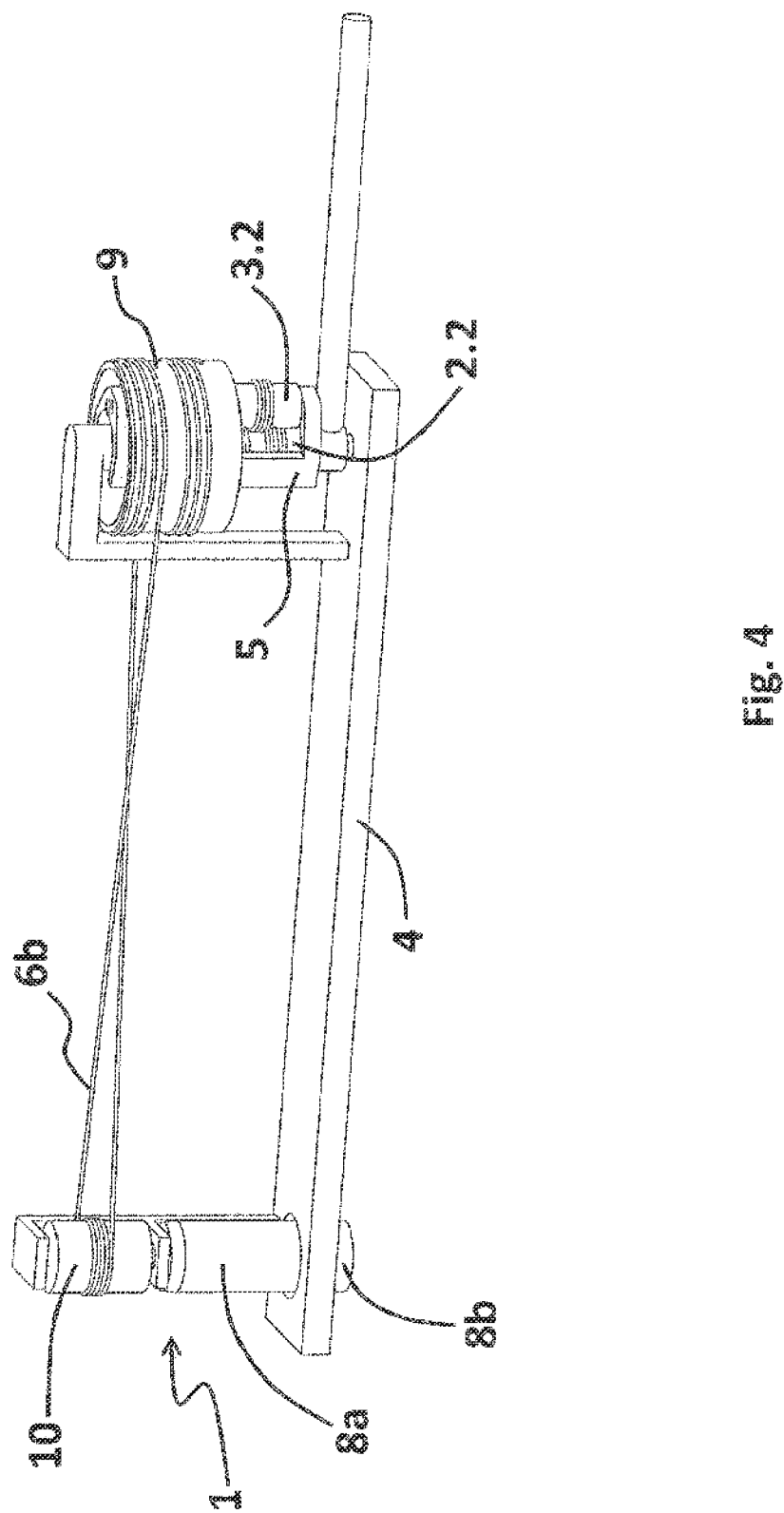
FIG. 4 is a view similar to FIG. 3 of a device according to a variant of the second embodiment.

In the variant of FIG. 4, the motor 8a, its encoder 8b and the pulley 10 are remote from the assembly of sun wheels—pulley 9—planet carrier 5.

It is noted that whatever the embodiment, the motor may be placed to have its output shaft not parallel to that of the planet carrier pulley 9: intermediate deflector pulleys are then used to guide the cable 6b of the pulley 10 to the pulley 9.

In all cases, as transmission takes place on the rapid strand before reduction, the function of the system is only very slightly degraded.

Figure 5:
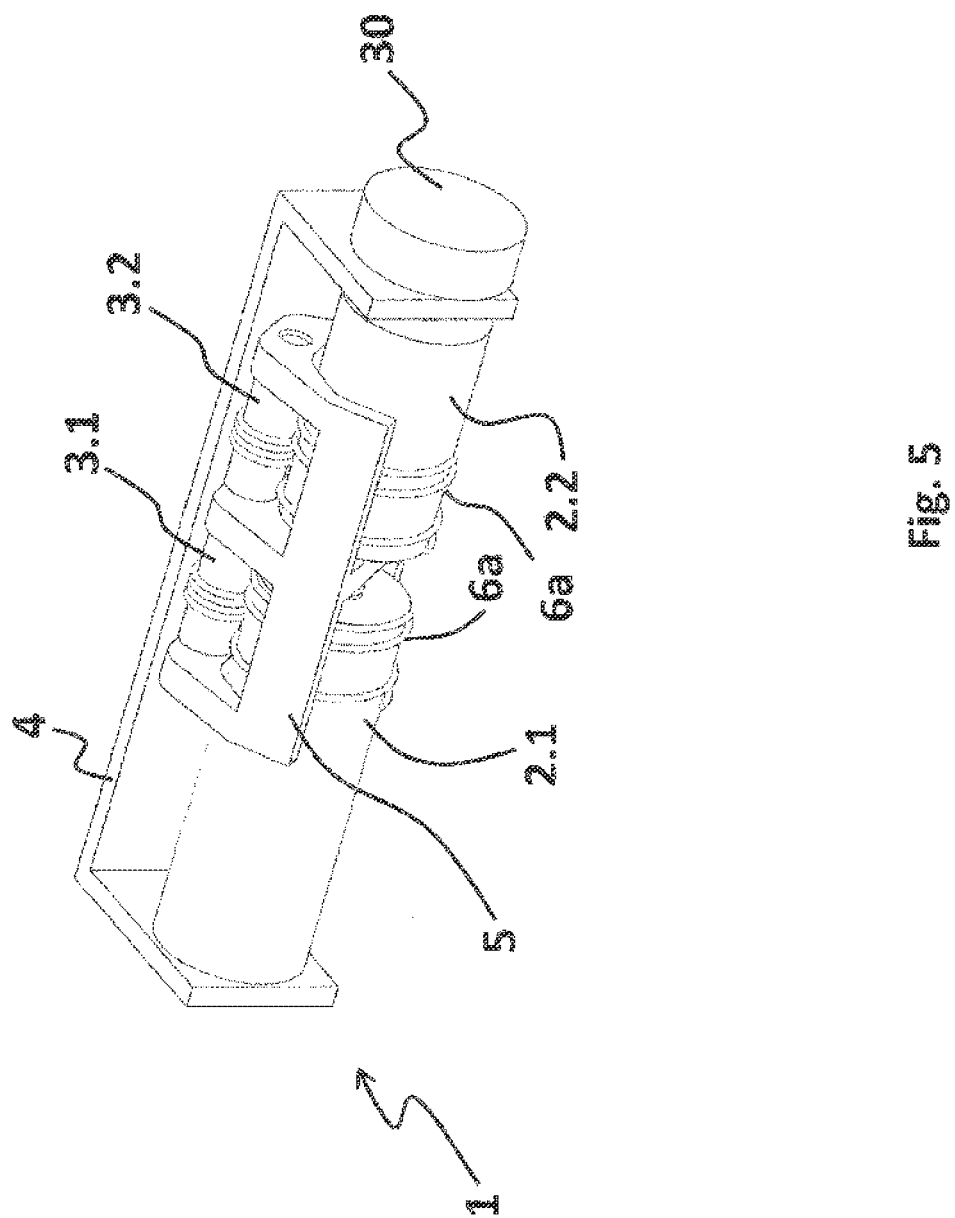
FIG. 5 is a diagrammatic, perspective view of a transmission device according to a third embodiment with cables.
Figure 6:
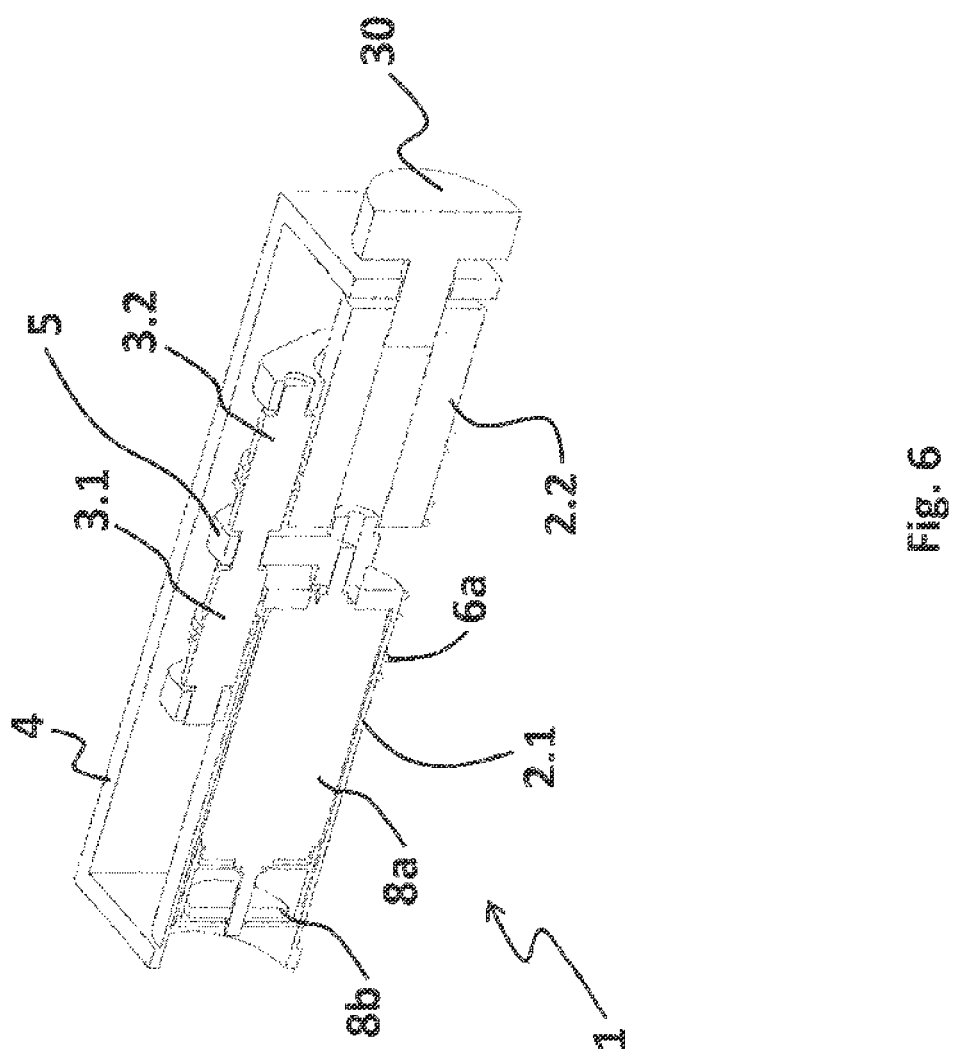
FIG. 6 is an axial section view of a transmission device in FIG. 5.

With reference to FIGS. 5 and 6 and according to the third embodiment, the first sun wheel 2.1 serves as a fixing and support base for the motor 8a with its encoder 8b (concealed on FIG. 5 by the sun wheel 2.1), the stator of which is here fixed directly to the first sun wheel 2.1.

On FIG. 6, the rotation guides are depicted in a simplified manner by radial clearances between the mobile parts. These guides could naturally be achieved by any appropriate, means such as for example and non-limitatively, plain bronze or polytetrafluoroethylene bearings, or ball bearings, needle roller bearings or roller bearings with straight or angular contacts.

Similarly, the parts fixed in rotation are depicted in a simplified manner by an absence of radial clearance. Of course in practice, these parts could be made fixed in rotation by any appropriate means, such as for example and non-limitatively by gluing, keying or by pressure screws. These means are known to the person skilled in the art and not described in detail here.

The planet carrier 5 is here fixed directly to the end of the output shaft of the motor 8a, such that the rotor drives the planet carrier 5 directly without the presence of pulleys 9, 10 and cable 6b. Thus the system is radially much more compact.

This solution is particularly advantageous when it is necessary to drive a body aligned with the motor, here a button 30. As a variant the body could for example be the prono-supination axis of the wrist of a robotic arm.

The mobile element could furthermore have a tubular form to surround the transmission device. This configuration is suitable if the mobile element is a handle held by the user (in this case, a small motor is selected and the system is dimensioned such that its outer diameter remains compatible with gripping in the palm or fingers, wherein the guides can be achieved with plain bearings, thin roller or needle roller bearings to limit the diameter of the assembly).

Figure 7:
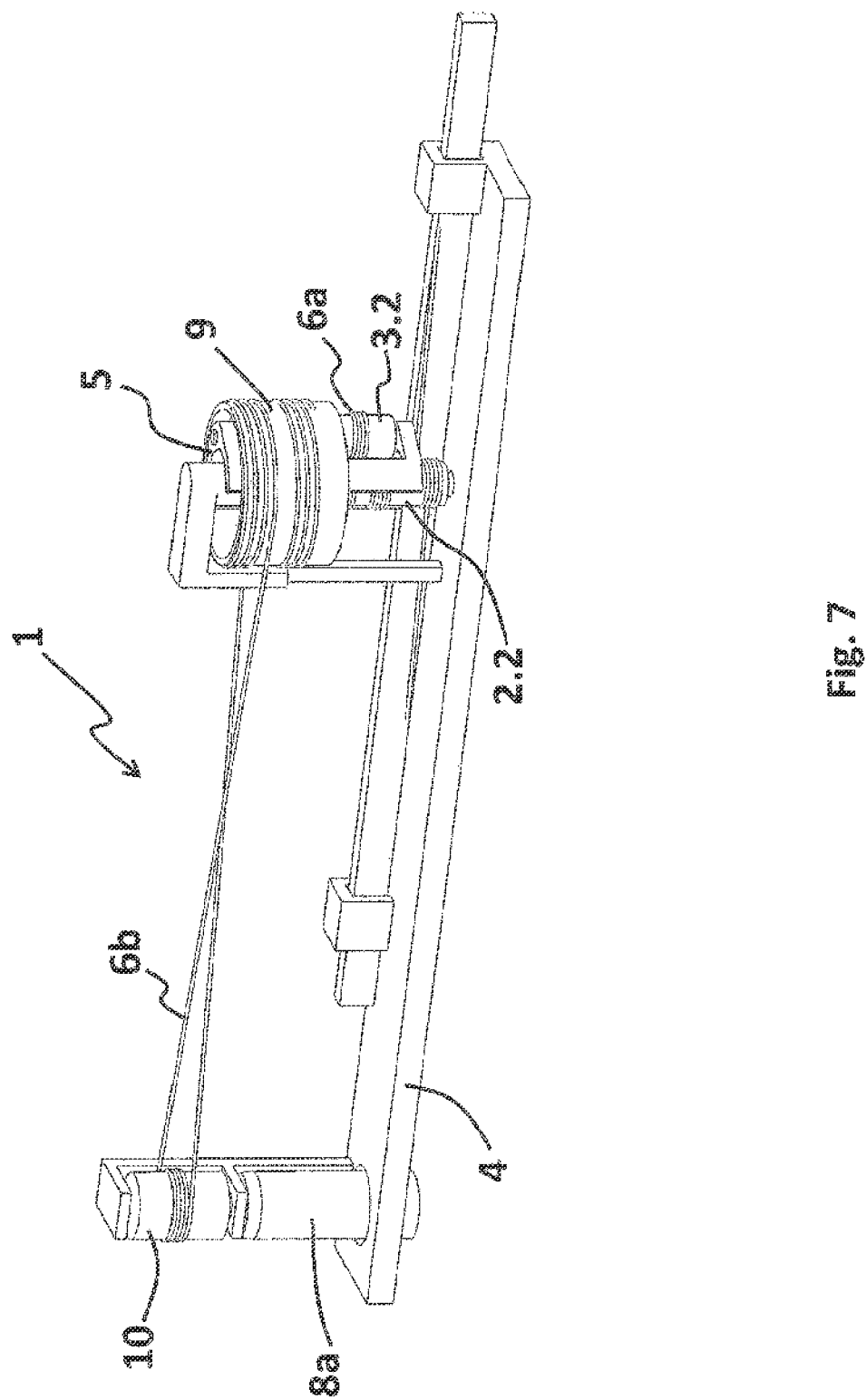
FIG. 7 is a diagrammatic, perspective view of a transmission device according to a fourth embodiment with cables.

With reference to FIG. 7 and in accordance with the fourth embodiment of the transmission device according to the present invention, the mobile element is mounted sliding on the support frame 4 and is linked to an output of an epicyclic reduction gearing by a rack-and-pinion connection. The rack-and-pinion connection here comprises for example a cable with at least one end portion fixed to the mobile element and one portion wound around a pinion linked in rotation to the secondary sun wheel 2.2. This method of transforming the rotational motion of the sun wheel 2.2 into a translational motion of the mobile element is given merely as an example, and any other means may be used to achieve this transformation, such as for example and non-limitatively a geared or friction rack-and-pinion assembly or a rod-crank assembly, without leaving the scope of the invention.

Figure 8:
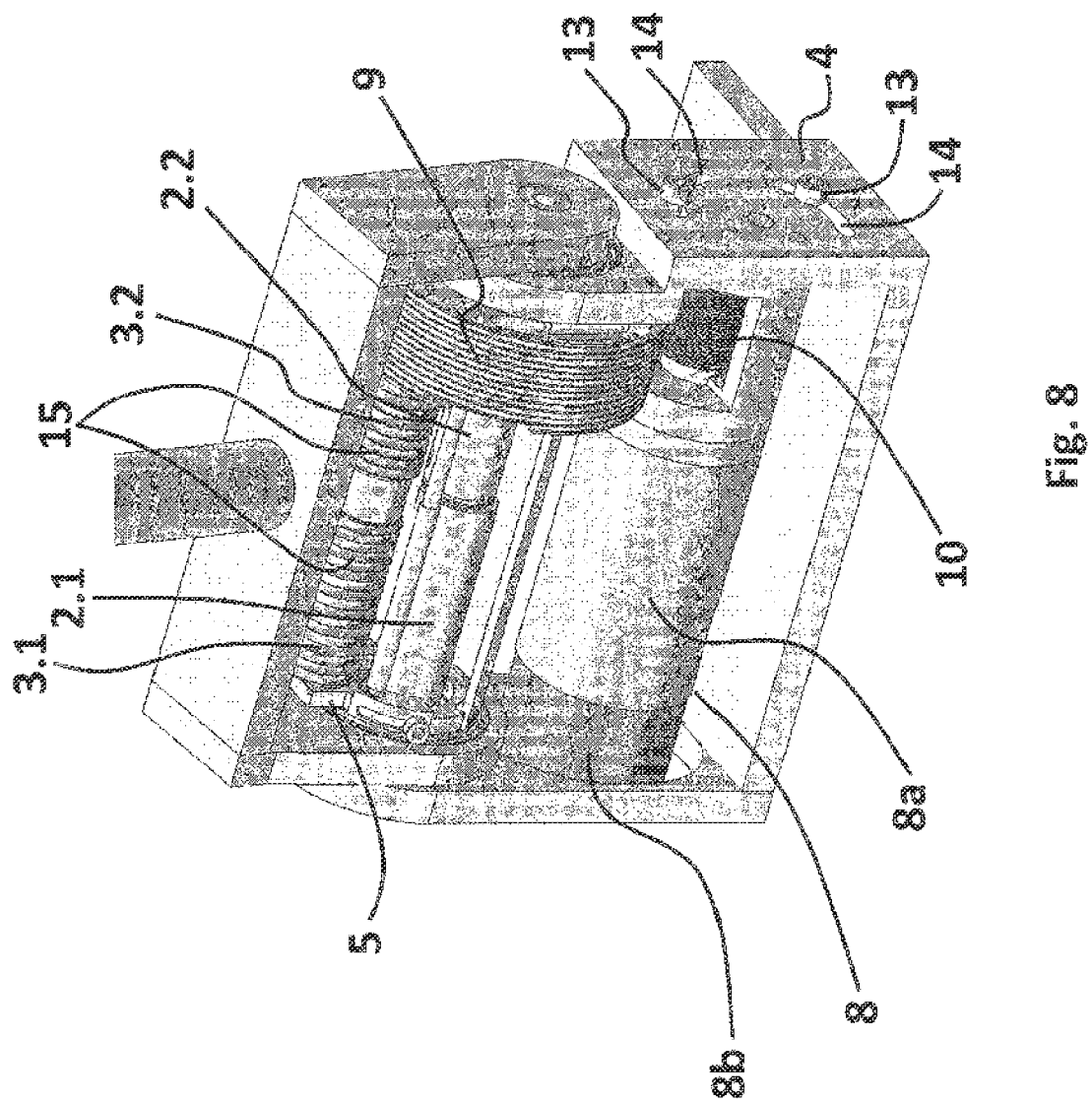
FIG. 8 is a detailed, perspective view of a particular implementation of the second embodiment with cables.
Figure 9:
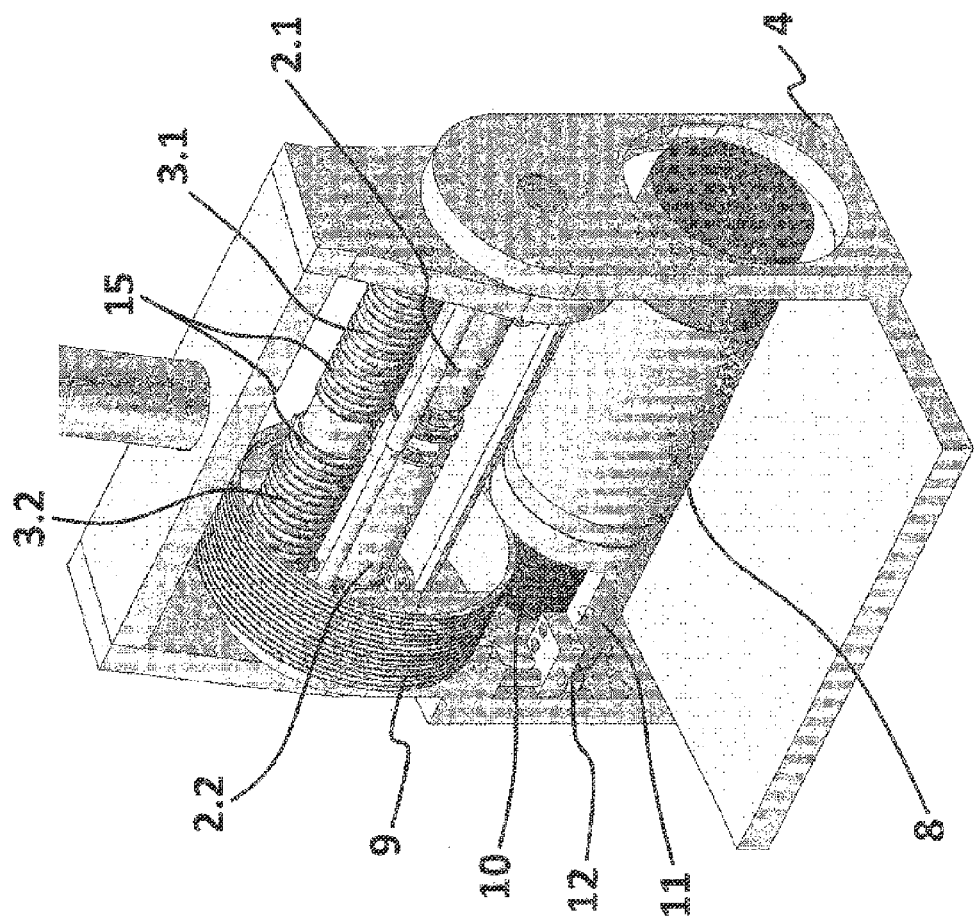
FIG. 9 is a view similar to FIG. 8 of the device from a different viewing angle.
Figure 10:
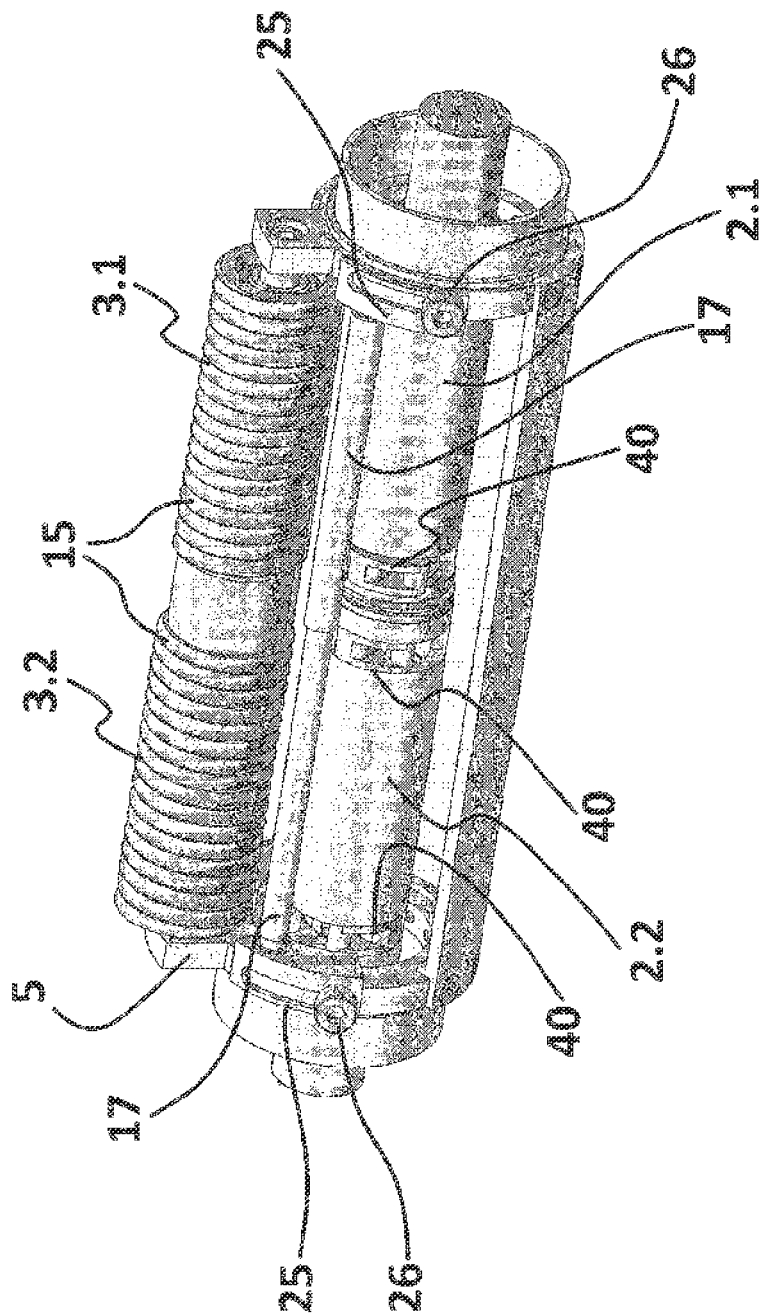
FIG. 10 is a perspective view of the sun wheel—planet wheel assembly of the device according to this implementation of the second embodiment.
Figure 11:
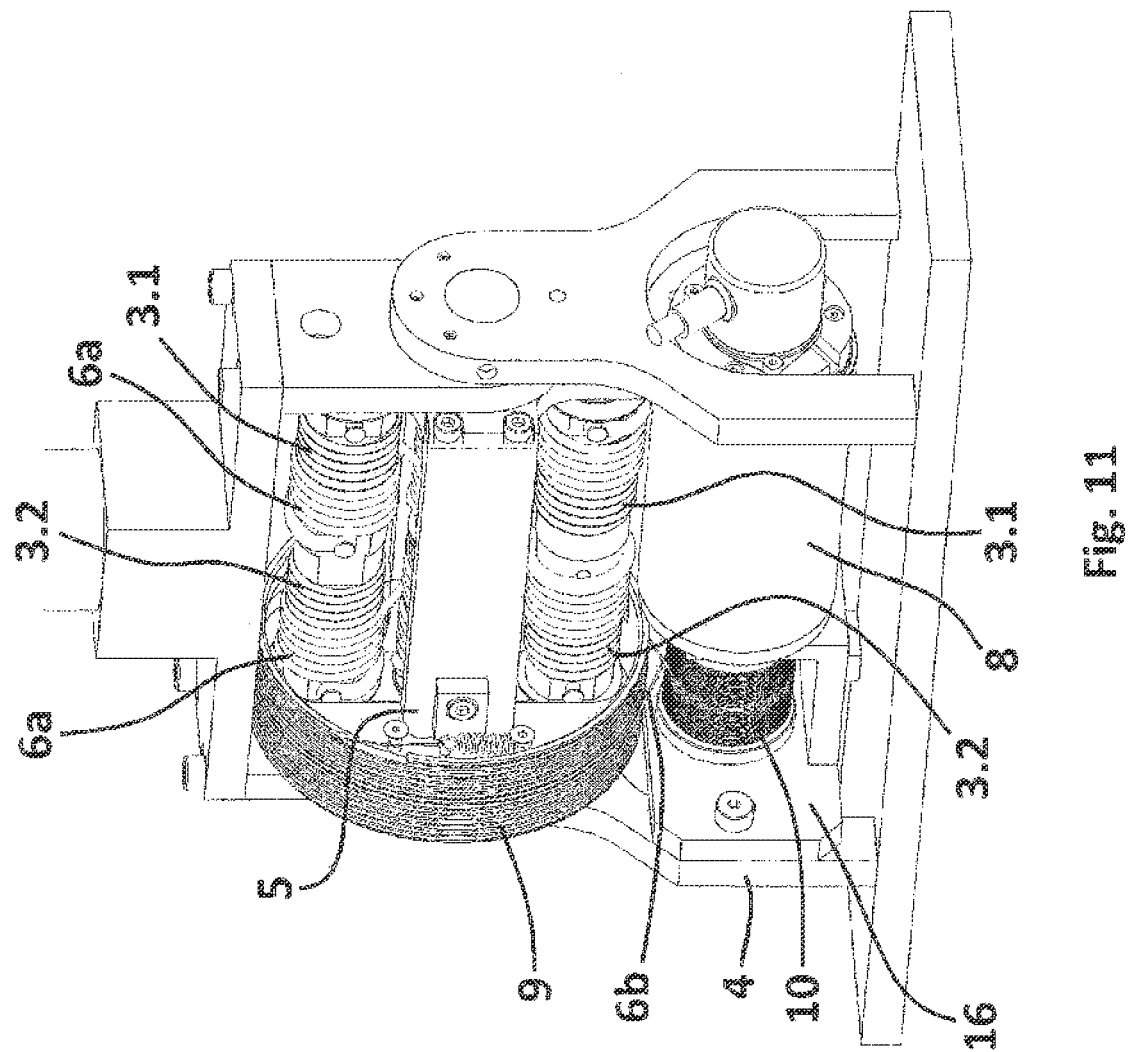
FIG. 11 is a view similar to FIG. 8 of a device according to a first variant of this implementation of the second embodiment.
Figure 12:
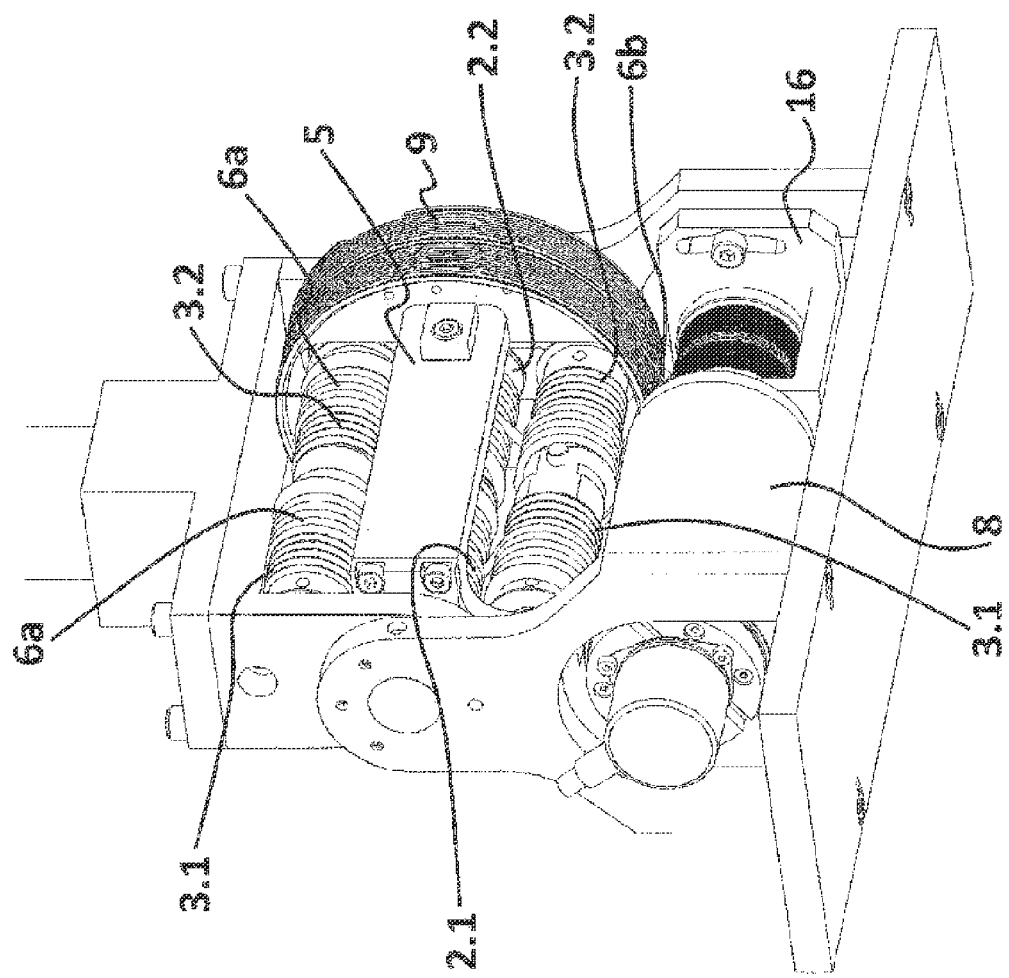
FIG. 12 is a view similar to FIG. 11 of this device from another viewing angle.
Figure 13:
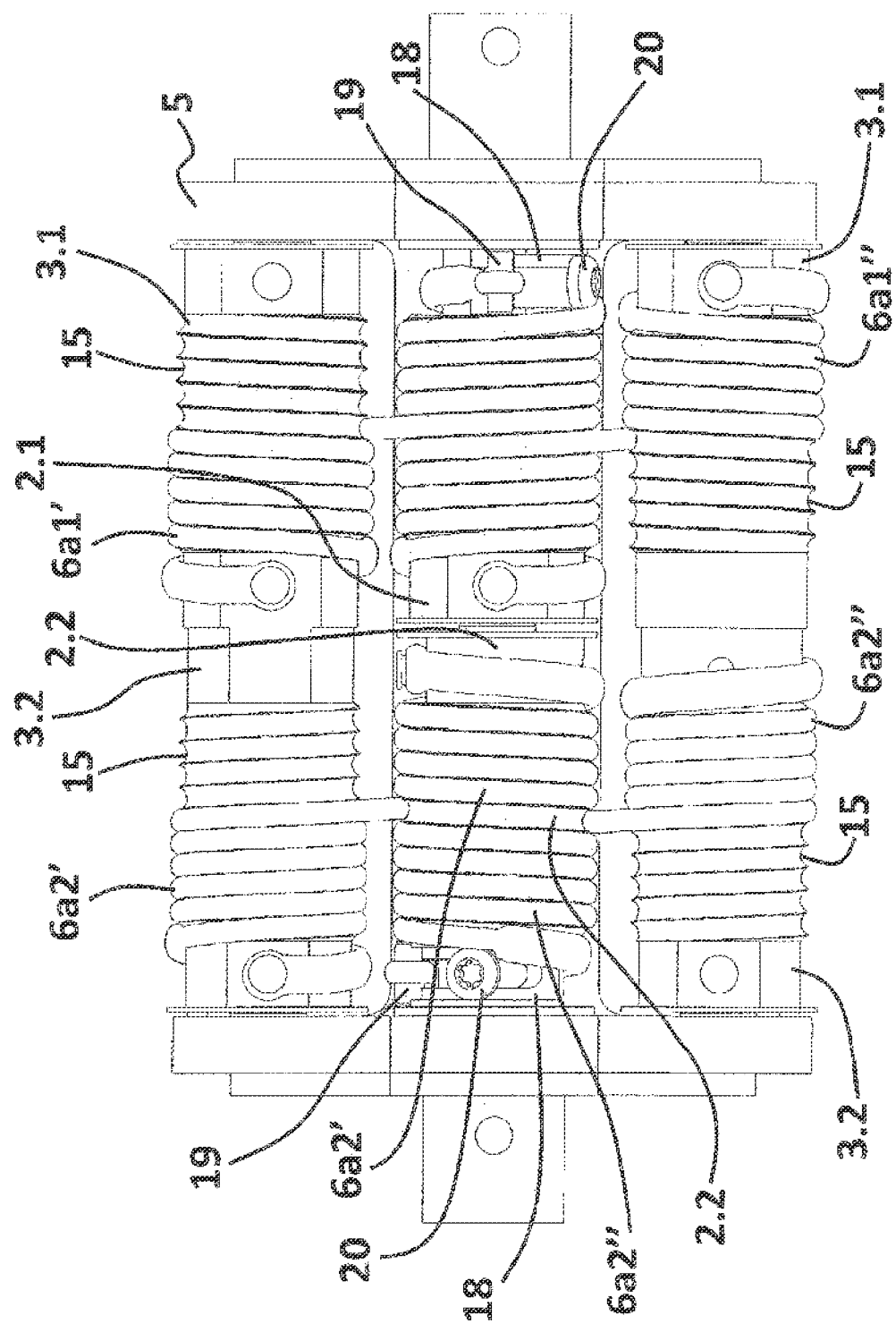
FIGS. 13 and 14 are views respectively from above and in perspective of the sun wheel—planet carrier—planet wheel assembly of the device according to this variant of implementation of the second embodiment.
Figure 14:
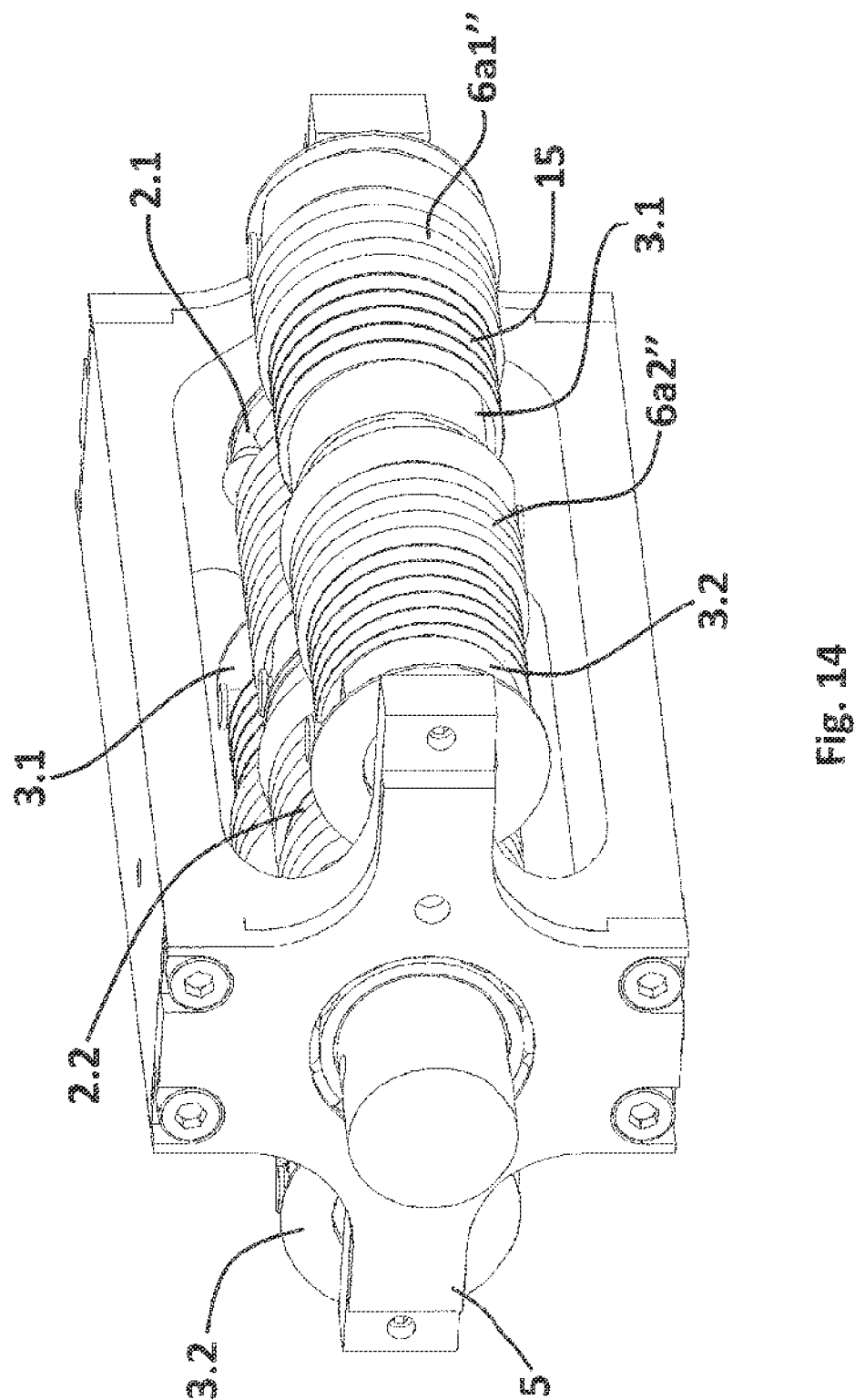
Figure 15:
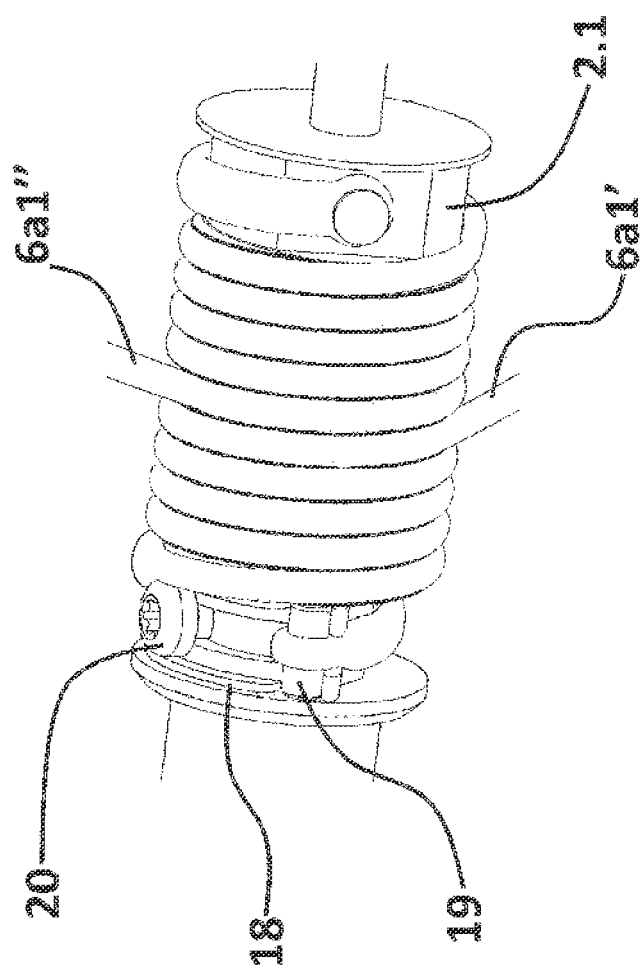
FIGS. 15 and 16 are perspective views of details of one of the sun wheels of this sun wheel—planet carrier—planet wheel assembly.
Figure 16:
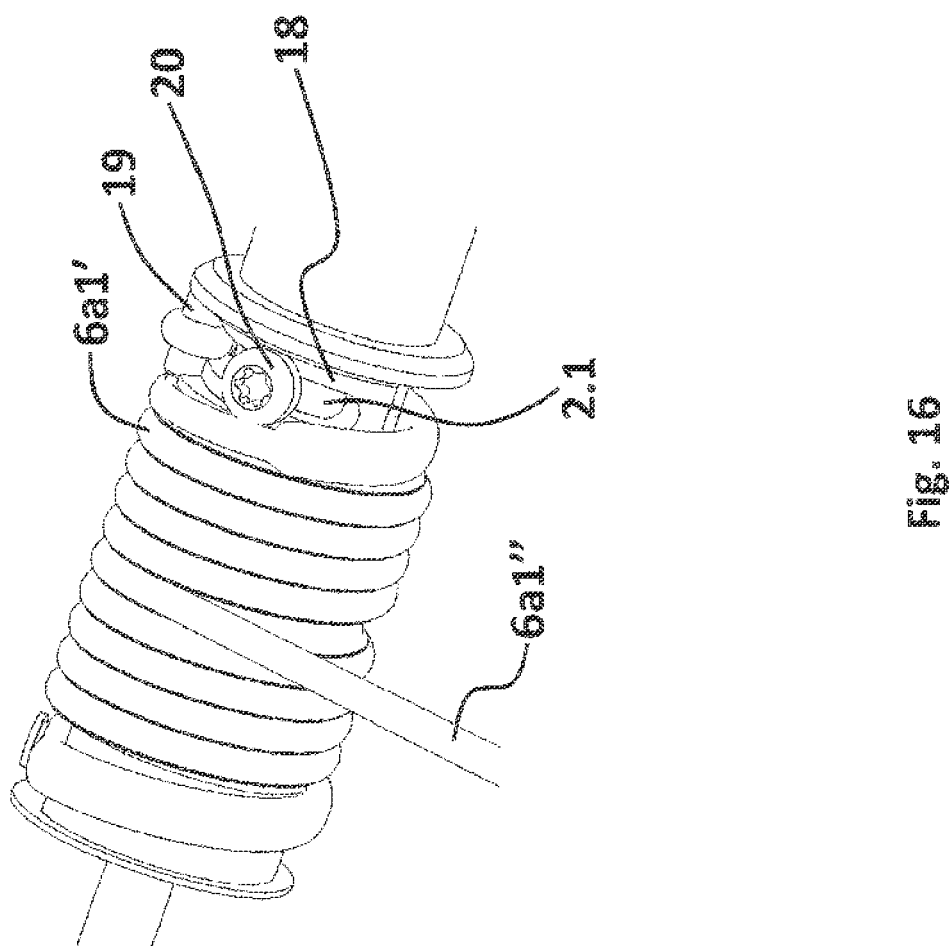
Figure 17:
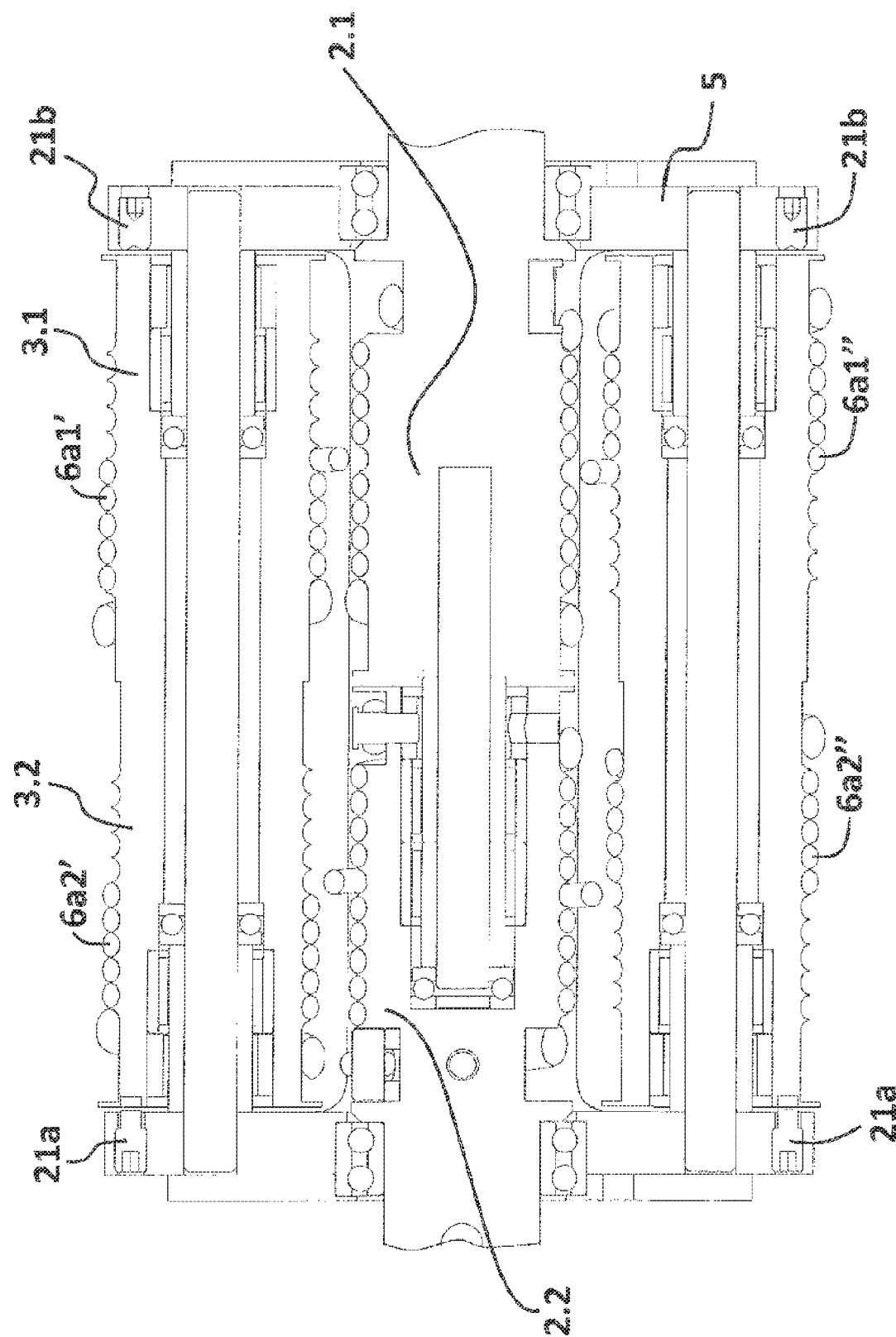
FIG. 17 is a section view of this sun wheel—planet carrier—planet wheel assembly.

A detailed implementation of the transmission device of the second embodiment will now be described with reference to FIGS. 8 to 10, on which the cables are not shown to improve the clarity of the figures.

The general structure of this transmission device has already been described in relation to FIGS. 1 to 3.

The motor block 8 consisting of the motor 8a and its encoder 8b is mounted on a support plate 11, mobile around an axis which is eccentric in relation to the axis of the motor, so as to be able to modify the distance between the axes of the pulley 9 of the planet carrier 5 and the pulley 10 for tensioning the cable connecting them. The tension is obtained by screw 12 (shown on FIG. 9) engaged in the support plate 11 so that its free end rests against the support frame 4. Two pressure screws 13, held in oblong orifices 14 provided in an arcuate pattern in the support frame 4, have their free end engaged in the support plate 11 to clamp the support plate 11 against the support frame 4, in order to block the rotation of the support plate 11 once the cable is tensioned.

The sun wheels 2.1, 2.2 here have substantially identical diameters. The two planet wheels 3.1, 3.2 are fixed in rotation.

A first secondary cable strand (not shown) has:
- a first end portion fixed to and wound around the first sun wheel 2.1;
- a central portion wound around the first planet wheel 3.1 on which it makes several turns (typically five or six in order to drive the planet wheel 3.1 correctly by friction);
- a second end portion fixed to and wound around the first sun wheel 2.1.

A second strand of the secondary cable (not shown) has:
- a first end portion fixed to and wound around the second sun wheel 2.2;
- a central portion wound around the second planet wheel 3.2 on which it makes several turns (typically five or six in order to drive the planet wheel 3.2 correctly by friction);
- a second end portion fixed to and wound around the second sun wheel 2.2.

To improve the friction of the cables on the planet wheels 3.1, 3.2, planet wheels 3.1, 3.2 comprise an external helicoidal groove 15 to receive the wound cable portion. It is understood however that planet wheels 3.1, 3.2 could also be smooth.

As the cable is helically wound on the pulleys and consequently not perpendicular to the pulley axis ("pulley" used in the general sense without numerical reference designates any pulley present in the epicyclic reduction gearing, and here in particular the sun wheels and planet wheels), it produces an axial force on the planet wheels and sun wheels. Consequently all pulleys, except the sun wheel 2.1 which is fixed, are mounted on bearings absorbing both axial and radial forces. Thus in this example, the sun wheel 2.2 and planet wheels 3.1, 3.2 are mounted mobile in rotation relative to sun wheel 2.1 and respectively to the planet carrier 5, on needle roller bearings necessary to absorb the radial forces which may be very high for a high force capacity. These needle roller bearings are associated with thrust ball bearings absorbing the axial forces.

The external helicoidal grooves 15 of the planet wheels 3.1, 3.2 here advantageously run in opposite directions to minimize axial forces.

As the two strands of the secondary cable are fixed at both ends on the sun wheels 2.1, 2.2, there is no need to provide external helicoidal grooves for the sun wheels to improve the friction of the cable thereon. Consequently they are smooth, which facilitates machining and at the same time allowing easier cable routing. It is however understood that the sun wheels 2.1, 2.2 could also be provided with external helicoidal grooves.

The distance between the axis of the sun wheels 2.1, 2.2 and that of planet wheels 3.1, 3.2 is here fixed.

Theoretically, it would be possible to calculate the precise length necessary for the cables and fix them non-adjustably on the sun wheels 2.1, 2.2. Here however tensioners 40 are provided at both ends of each of the two cable strands of the epicyclic reduction gearing. Two tensioners are arranged on the sun wheel 2.1 and two further tensioners on the sun wheel 2.2 (the second tensioner of sun wheel 2.1 is concealed by the end of the planet carrier 5 on FIGS. 8 to 10). They are mobile in rotation around the axis of sun wheels 2.1, 2.2 and may be moved and fixed by screws, which allows tensioning of the cable strands and absorption of any slack.

The planet carrier 5 is produced in three parts joined together by screws, and carries very long idler pulleys 17 intended to hold the cables against planet wheels 3.1, 3.2 along these at their inlet and outlet. The idler pulleys 17 maintain the winding angle of the cable around planet wheels 3.1, 3.2. This ensures that any slack is not transferred onto the portion of cable wound around the planet wheels, which could damage the friction of the cable and the drive of the planet wheels. It is noted that the ends of the idler pulleys 17 are each mounted mobile in rotation on a base 25 mounted on the planet carrier 5, so that their position relative to planet wheels 3.1, 3.2 can be adjusted by means of a screw 26 passing through an oblong hole provided in the base. This allows the idler pulleys 17 to be telescoped for assembly, and/or where applicable to apply the idler pulleys 17 on cables to act as tensioners.

In this implementation, the cable strands pass over sun wheels 2.1, 2.2 to planet wheels 3.1, 3.2 and then return to sun wheels 2.1, 2,2 after having made several turns around planet wheels 3.1, 3.2. The result is a great length of the assembly. To reduce this length, the outward and return paths of the cable strands from the sun wheels 2.1, 2.2 to the planet wheels 3.1, 3.2 can be separated, as shown in FIGS. 11 to 17.

In the first variant of FIGS. 11 to 17, the device comprises a plurality of first planet wheels 3.1 and second planet wheels 3.2 mounted on the planet carrier 5 symmetrically about the axis of sun wheels 2.1, 2.2.

More precisely, the device comprises two pairs of planet wheels 3.1, 3.2 arranged at 180° to each other, and the device uses four secondary cable strands 6a1', 6a1", 6a2', 6a2", each only transmitting the motion of one sun wheel 2.1, 2.2 to one planet wheel 3.1, 3.2 in one direction. Under these conditions, the two end portions of each of the cable strands 6a1', 6a1", 6a2', 6a2" can be fixed to the sun wheels 2.1, 2.2 and the planet wheels 3.1, 3.2 and no winding is necessary to ensure adhesion of the cable to the latter. Consequently the length of the assembly is reduced. Thus each sun wheel 2.1, 2.2 is linked to the corresponding planet wheel 3.1, 3.2 by two cable strands 6a1', 6a1", 6a2', 6a2" fixed to the sun wheel 2.1, 2.2 and to the planet wheel 3.1, 3.2, so that each transmits the motion in one direction.

The end portions of the cables are fitted with splices (but these could also be knots), indicated by thicker portions of the cables. These splices are locked by studs and tensioners fixed respectively to the planet wheels 3.1, 3.2 and the sun wheels 2.1, 2.2. As the sun wheels 2.1, 2.2 are larger than the planet wheels 3.1, 3.2, these are provided with tensioners consisting of parts able to rotate about the axis of the sun wheels and be fixed by screws. Naturally the tensioners could also be mounted on the planet wheels and the studs on the sun wheels. It would also be possible to fit both planet wheels and sun wheels with tensioners.

Each tensioner here comprises a yoke 18 for attachment of the end portion. The yoke 18 comprises an open end fitted with retaining hooks for a rod 19 passing through the splice of the end portion, and has an oblong orifice for passage of a fixing screw 20 of the yoke 18 to the element about which the end portion is wound and on which it is fixed, here sun wheel 2.1, 2.2. The orifice has longitudinal edges forming a span of increasing height along a longitudinal direction of the orifice for the screw head 20, the span having a low part on the hook side and a high part opposite this. The tensioner therefore has a wedge shape to remain effectively blocked when the screw is tightened. Any other type of tensioner could of course be used. It is noted that the hooks also comprise a claw for support against the surface of the sun wheel beyond the rod 19, so as to oppose any deformation of the hooks (opening thereof) under a traction force exerted on the rod 19.

The cables are tensioned as follows. The planet carrier 5 and the mobile element are first immobilized in orientation using removable spindles, not shown on the figures, which are inserted in opposing pierced holes on the fixed frame 4 and on the planet carrier 5 and the mobile element, to form means for temporarily blocking rotation. The planet wheels 3.1, 3.2 are then also blocked in orientation using dog point screws 21a (shown on FIG. 17). The first end portion of a first strand of a first cable 6a2' is then fixed to the sun wheel 2.2 and wound thereon, then passed over the portion of planet wheel 3.2 (shown at the top on these figures) on which it is wound and on which the other end portion of the cable strand 6a2' is fixed. This portion of the planet wheel 3.2 is then released by unscrewing the dog point screw 21a and turning the planet wheel 3.2 slightly if necessary to tension the cable strand. If the cable strand has been carefully prepared to the right length, the rotation of planet wheel 3.2 is zero or very slight, and the setting of the threads of the various pulleys is not modified or scarcely modified. The orientation of this portion of the planet wheel 3.2 is then re-fixed using a pressure screw 21b (advantageously with a cup end to improve the rotation blocking) acting on planet wheel 3.1. The first end of a second strand of the first cable 6a1' is then attached to the first threaded portion of planet wheel 3.1, then wound around this, passing over the sun wheel 2.1 on which it is wound. Finally, the second end of the second strand of the first cable 6a1' is attached to the tensioner which is mobile in rotation on the sun wheel 2.1. This tensioner is then adjusted to ensure a cable tension, then locked by tightening screw 20. The principle is the same for the other two cable strands 6a1", 6a2" which are wound over the two other portions of planet wheels 3.1 and 3.2 shown at the bottom on the figures.

For series mounting, cables strands of the correct length could also be prepared and fixed easily without a tensioning system.

It is noted that the diameters of the sun wheels and planet wheels (and consequently the pitch of the threads) are selected similar to each other. This in fact minimizes the length of the sun wheels and planet wheels. However sun wheels which are larger than the planet wheels could be selected without leaving the scope of the invention, this solution allowing minimizing of the forces in the cables.

It is also noted that the diameters of the sun wheels and planet wheels are selected as small as possible. Consequently the rotational guidance of the planet wheels 3.1, 3.2 on the planet carrier 5 is ensured by needle roller bearings, shown on FIG. 17 without reference. The sun wheel 2.2 is also guided in rotation relative to sun wheel 2.1 by needle roller bearings. The axial forces are absorbed by needle thrust bearings, also visible on FIG. 17. Since the constraints of compactness are less critical on the planet carrier 5, this is guided in rotation relative to sun wheels 2.1 and 2.2 by double row, angular contact ball bearings, shown on FIG. 17, which also absorb axial forces. It is understood that any other guidance solution allowing absorption of both radial and axial forces could be used without leaving the scope of the invention.

A numerical example is given below purely for information. The pulley 10 for example has a useful diameter of 26 mm and the pulley 9 of the planet carrier 5 a useful diameter of 78 mm, which would allow a first reduction ratio r1=3. The cable connecting these two pulleys is for example produced from aramide or "micro-dyneema" type fibers, and has a diameter of 0.42 mm. The two pulleys 9, 10 have helicoidal grooves to improve the adhesion and guidance of the cable. The pitch here is 0.5 mm on pulley 10 and 1.5 mm on pulley 9. This pitch ratio is selected as a function of the reduction gearing so that the system functions correctly. Here the cable makes almost six turns around pulley 10, which corresponds to the smallest number ensuring both sufficient adhesion of the cable to the pulley and that the cable falls opposite the grooves of the pulley 9 at the inlet and outlet from the motor pulley 10. The cable could also have a different size and/or be made of a different material. In this case the pitch of the external grooves must be adapted. Here again, the motor block 8 is mounted on a support plate 16 which is mobile around an eccentric axis in relation to the axis of the motor, so that the distance between the axes of pulleys 9, 10 can be modified to tension the cable 6b. The tension is obtained by manual movement of the motor block 8, which is then held in place by means of a screw which presses the support plate 16 of the motor block 8 onto the support frame 4.

Figure 18:
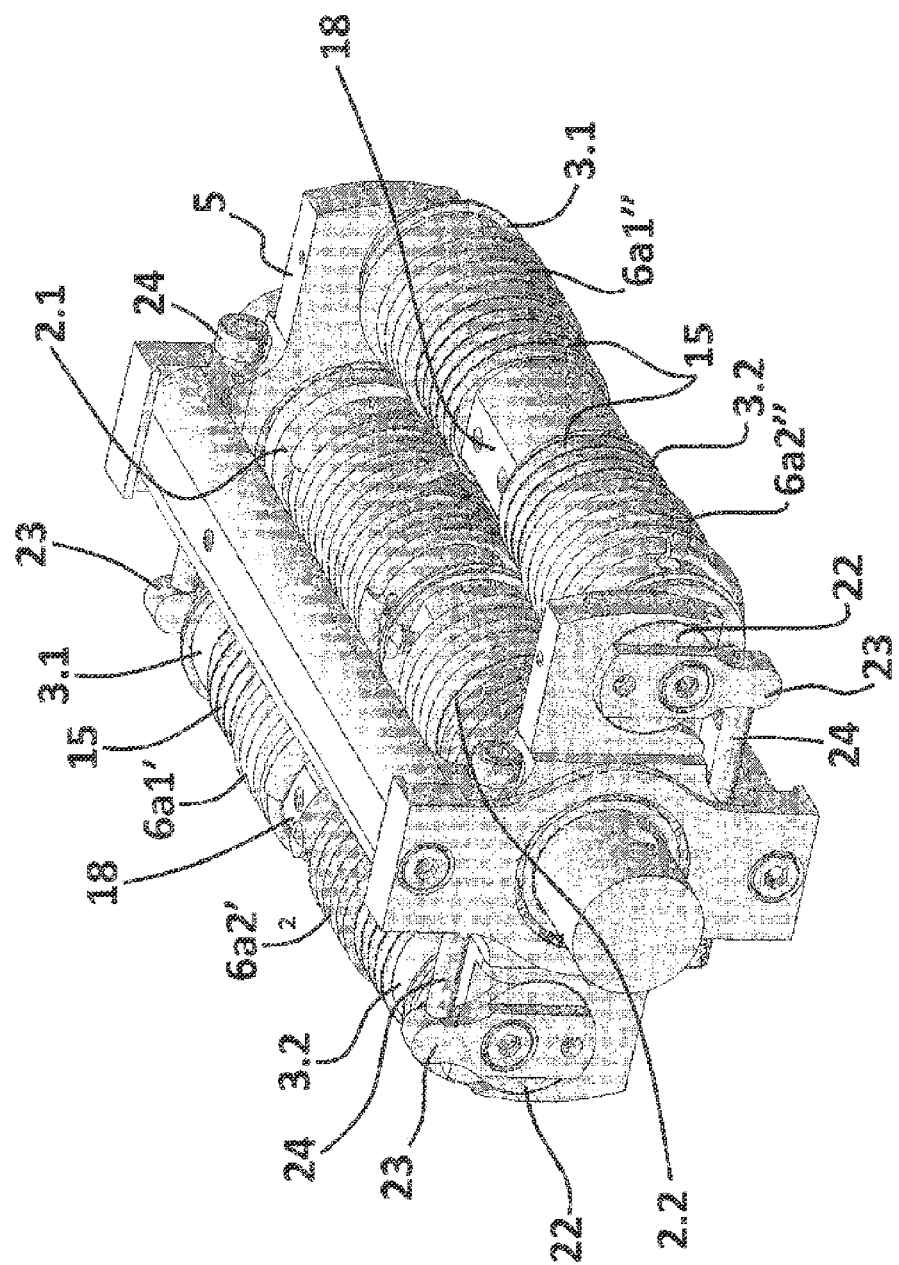
FIG. 18 is a perspective view of the sun wheel—planet carrier—planet wheel assembly of a device according to a second variant of this implementation of the second embodiment.

In the second variant shown in FIG. 18 (in which the cable splices and locks are shown more diagrammatically), the two planet wheels 3.1, 3.2 of each pair have the same diameter for ease of machining, the diameters of sun wheels 2.1, 2.2 being different. Thus the external grooves 15 of the planet wheels 3.1, 3.2 are machined successively in a single pass. Under these conditions it is not possible to change the direction of winding between the two planet wheels 3.1, 3.2, and the cables cannot be tensioned as before. Planet wheels 3.1, 3.2 are then mounted on eccentric shafts 22 associated with crank pins 23 which come to rest on screws 24 engaged in the planet carrier 5. This provides an additional tensioning means for the cables by forming an element for adjusting the distance between the sun wheels and the planet wheels. In addition to the tensioners of sun wheels 2.1 and 2.2, they ensure the tension of the four cable strands.

Figure 19:
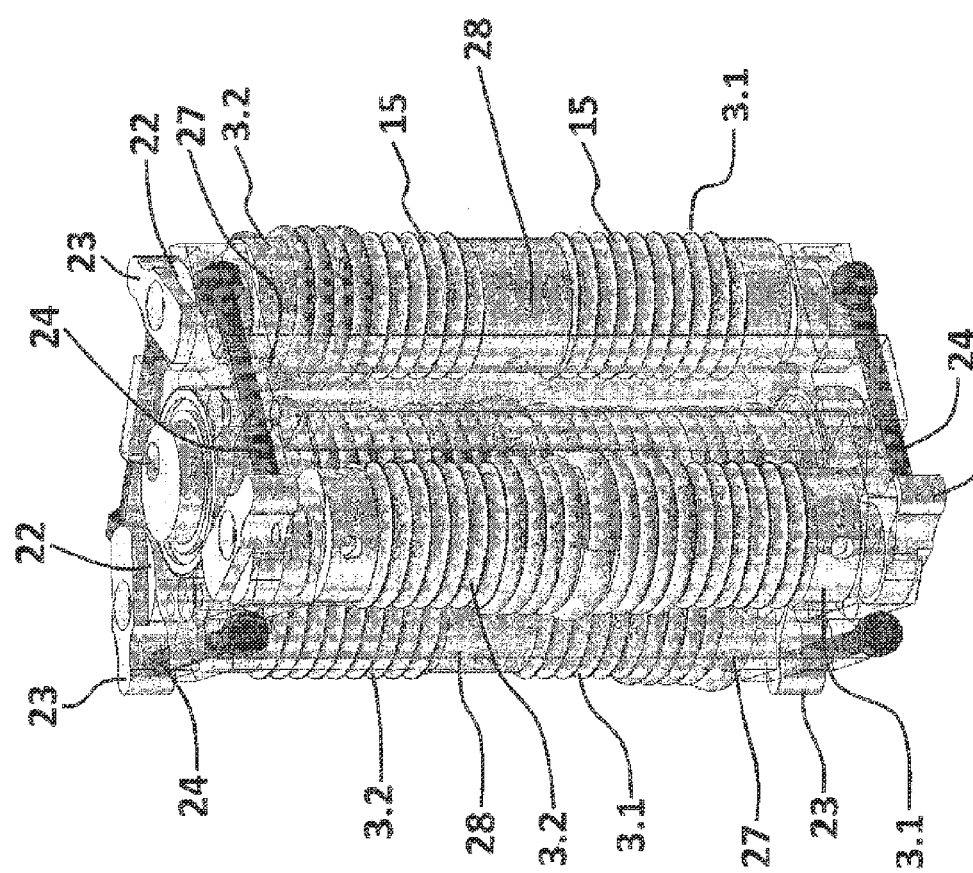
FIG. 19 is a perspective view of the sun wheel—planet carrier—planet wheel assembly of a device according to a third variant of this implementation of the second embodiment.

As a variant of the device in FIG. 18 and in accordance with FIG. 19 (in which the cable splices and locks are shown more diagrammatically and in which the cable portions running from the sun wheels to the planet wheels have not been shown), the device is provided with three pairs of planet wheels 3.1, 3.2 arranged at 120° from each other, two of these receiving only a single cable strand and the third two cable strands. It is thus possible to fix all ends of the cables using the simple studs inserted in holes 27, and tension these using eccentrics on the axes of planet wheels 3.1, 3.2.

It is noted that the studs are advantageously engaged in flats 18 (shown on FIG. 18) to prevent these from protruding beyond the cables wound around the planet wheels and coming into collision with these or with other parts of the device. Advantageously also the external grooves 15 are then progressively connected to the flat, to avoid creating a stress concentration zone or ridges in the cables which could damage the cables.

These flats are not however compulsory and the fixing studs for the cable ends can be inserted on cylindrical portions 28 (shown on FIG. 19) of the sun wheels and planet wheels.

Figure 20:
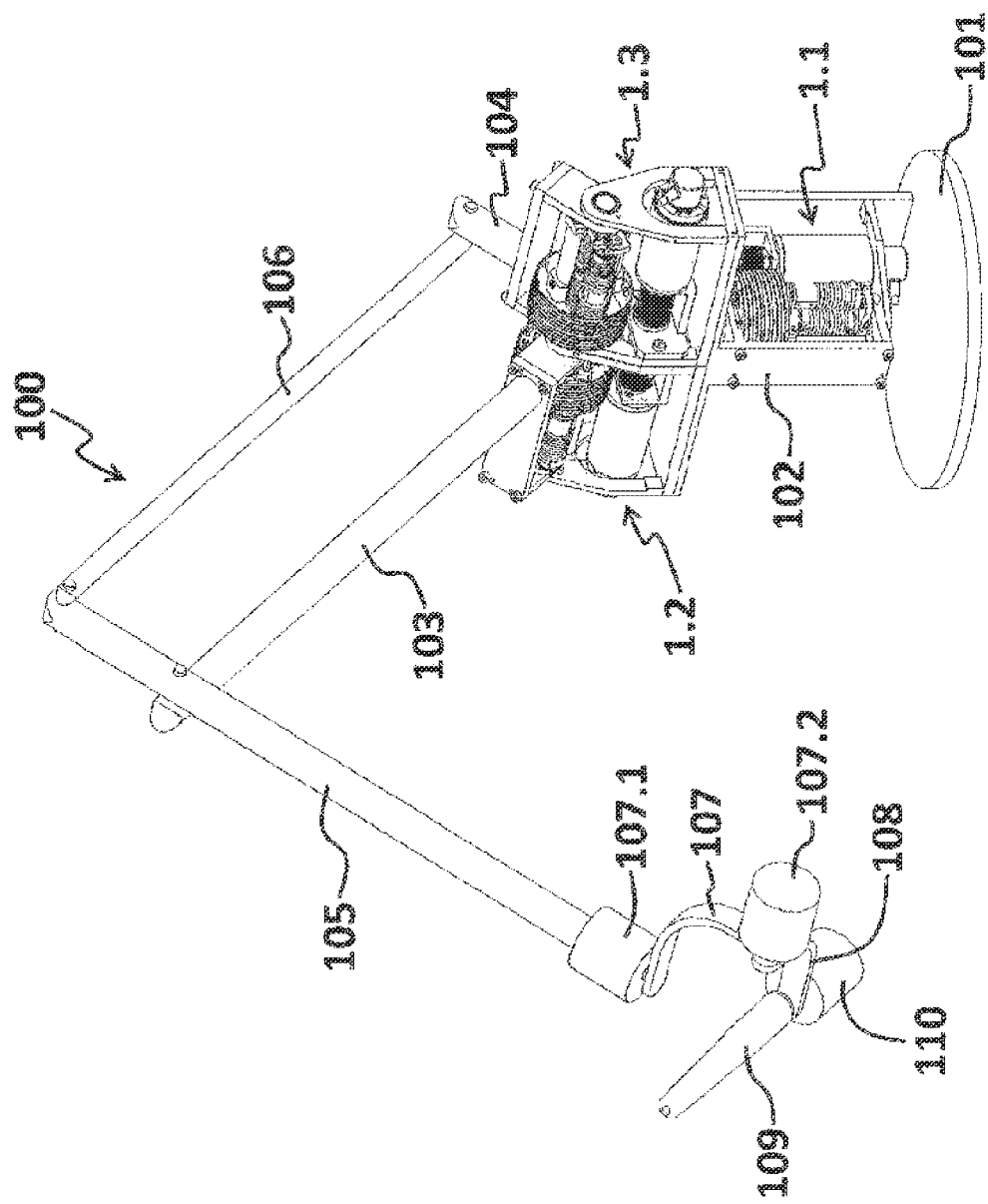
FIG. 20 is a perspective view of a robotized arm according to a first application of the transmission device according to the invention.

FIG. 20 shows a first application of the invention to a manipulation arm 100, intended to form a haptic interface and to this end having a handle as a terminal element.

The arm 100 thus comprises a first segment forming a base 101 on which a second segment is mounted, via a transmission device 1.1, which forms a trunk 102 to pivot around a vertical axis. A third and a fourth segment forming the arm 103 and connecting rod 104 are mounted, via transmission devices 1.2 and 1.3, on the second segment 102 to pivot around a substantially horizontal axis. A fifth segment forming the forearm 105 is mounted on the third segment 103 to pivot around a substantially horizontal axis. The forearm 105 is driven in rotation by a sixth segment 106 forming an actuating rod, itself driven by the connecting rod 104. The assembly of the arm 103, connecting rod 104, forearm 105 and rod 106, constitutes a parallelogram structure well known to the person skilled in the art. The rotation axes of the arm 103 and connecting rod 104 relative to the trunk 102 need not be aligned, the above assembly then forming a five-bar mechanism structure.

A first portion of the wrist 107, with two motorized articulations of advantageously concurrent and perpendicular axes, is connected by one of these motorized articulations 107.1 to the fifth segment 105, and by the other of its motorized articulations 107.2 to a second segment of the wrist 108, on which a handle 109 is mounted via a motorized articulation 110.

The first segment forming the base 101 is the input of the transmission device 1.1, while the second segment forming the trunk 102 is the output (or mobile element) of the transmission device 1.1. The second segment 102 is also the input to the transmission devices 1.2 and 1.3, the output of which is formed respectively by the third segment 103 and the fourth segment 104. The transmission devices 1.1, 1.2, 1.3 are for example of the type shown in FIGS. 11 and 12.

The motorized articulations 107.1, 107.2, 110 may for example be formed by electric motors or conventional gear motors, the carried element being linked to the output shaft of the motor or reduction gearing, or via transmission devices of the type shown in FIGS. 5 and 6.

Figure 21:
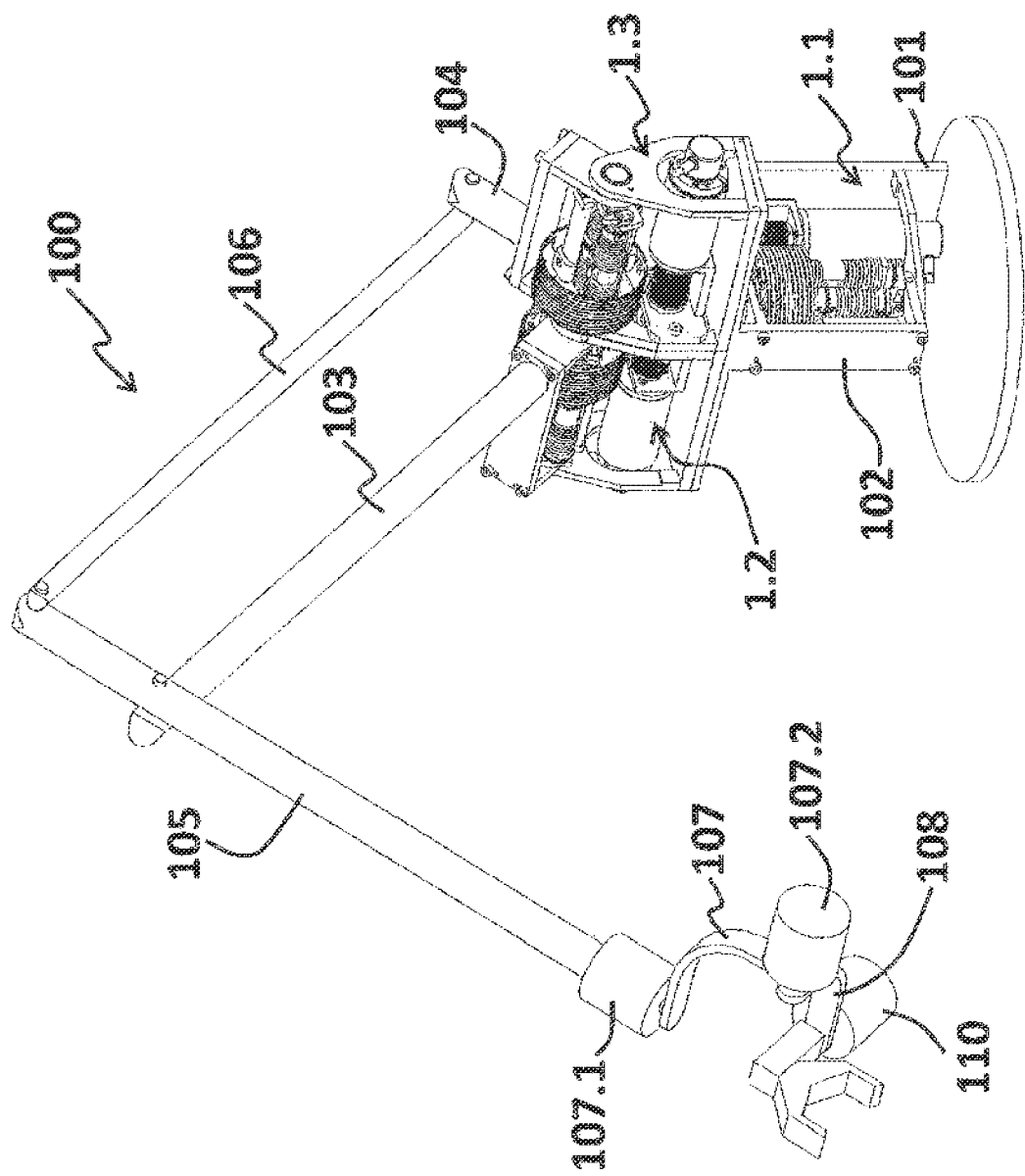
FIG. 21 is a perspective view of a robotized arm according to a second application of the transmission device according to the invention.

FIG. 21 shows a second application of the invention to a manipulation arm 100 intended to form a robot. The manipulation arm 100 of FIG. 21 is identical to that in FIG. 20 except that the handle has been replaced by a pincer. This pincer advantageously comprises an additional motor allowing control of closure of the pincer.

It is understood that the invention could easily be applied to a collaborative robot, for example by adding a tool to the haptic interface of FIG. 20 and using it as a cobot, or by adding a handle to the end of the robot in FIG. 21, enabling the user to move it easily, directly at or close to the pincer.

Figure 22:
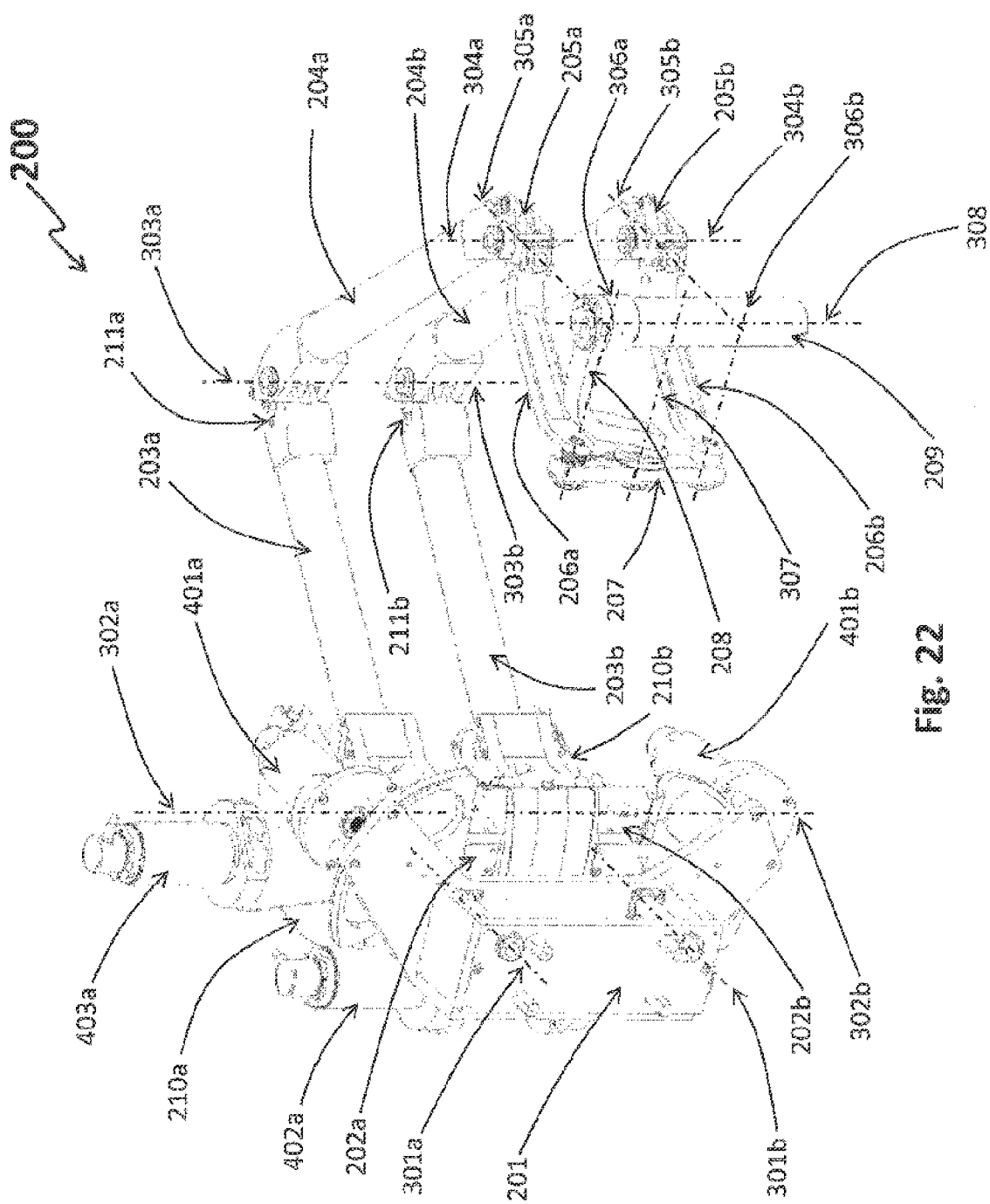
FIG. 22 is a perspective view of a robotized arm according to a third application of the transmission device according to the invention.

FIG. 22 shows a third application of the invention to a manipulation arm 200 intended to form a haptic interface and to this end having a terminal element provided with a handle.

The arm comprises a fixed base 201, two trunks 202*a* and 202*b*, and a plurality of segments 203*a*, 204*a*, 205*a* and 203*b*, 204*b*, 205*b* mounted to pivot in pairs in relation to each other, two first wrist segments 206*a* and 206*b*, a second wrist segment 207, a handle carrier 208 and a handle 209. The trunks 202*a* and 202*b* are mobile in rotation relative to the base 201 around the two axes 301*a* and 301*b* which are advantageously parallel and here horizontal. These rotation movements are measured and controlled using motor blocks 401*a* and 401*b*, each consisting of a motor and an angular position sensor fixed to the base 201. Segments 203*a*, 203*b*, respectively 204*a*, 204*b* and 205*a*, 205*b*, are mobile in rotation around axes 302*a*, 302*b*, respectively 303*a*, 303*b* and 304*a*, 304*b*, in relation to trunks 202*a*, 202*b*, respectively segments 203*a*, 203*b* and 204*a*, 204*b*. Axes 302*a*, 303*a* and 304*a*, respectively 302*b*, 303*b* and 304*b*, are advantageously parallel to each other and perpendicular to axis 301*a*, respectively 301*b*. The motor blocks 402 (of which only that referenced 402*a* mounted on trunk 202*a* is visible in the figure) are mounted on trunks 202*a* and 202*b* and used to measure and control the movements of segments 203*a* and 203*b*. Other motor blocks 403 (of which only that referenced 403*a* mounted on trunk 202*a* is visible on the figure) are again mounted on trunks 202*a* and 202*b*. The motors of motor blocks 403 are fitted with leading pulleys which drive secondary pulleys 210*a* and 210*b* (or more precisely pulley sectors) via cable capstans. Naturally any other type of reduction gearing could be used between the motor blocks 403 and parts 210*a*, 210*b*, such as for example and non-limitatively friction reduction gearing or gear wheels. The motor blocks 403 are used to measure and control the movements of segments 204*a* and 204*b*, firstly via pulleys 210*a* and 210*b* serving as connecting rods, and secondly via rods 211*a* and 211*b* which here pass inside segments 203*a* and 203*b* and form parallelogram structures together with segments 203*a* and 203*b*, 204*a* and 204*b* and with pulleys 210*a* and 210*b*. Finally, double parallelogram devices, the first connecting rods of which (passing in segments 203*a* and 203*b* in parallel to connecting rods 211*a* and 211*b* and not visible on the figure) are fixed to trunks 202*a* and 202*b*, and the second connecting rods (passing in segments 204*a* and 204*b*, and of which only the end is visible in FIG. 22) are fixed to segments 205*a* and 205*b*, ensure that axes 305*a* and 305*b* of rotation between segments 205*a* and 205*b* and the first wrist segments 206*a* and 206b remain parallel to axes 301a and 301b irrespective of the robot's movements. The second wrist segment 207 is mobile in rotation relative to the first wrist segments 206a and 206b around two advantageously parallel axes 306a and 306b. The handle carrier 208 is mobile in rotation relative to the second segment 207 around an axis 307 parallel to axes 306a and 306b. A motion amplification device is introduced here between the second segment 207 and the handle carrier 208. The rotation of the handle carrier 208 around axis 307 is directly controlled by the movement of segment 207 around axes 306a and 306b, and amplified relative to these rotations. Finally, the handle 209 is mobile in rotation around an axis 308 advantageously perpendicular to axis 307. The presence of the handle carrier 208 is not essential, and the handle could also be mounted directly mobile in rotation relative to the second segment 207, which should however be elbowed such that axes 308 firstly and 306a and 306b secondly advantageously remain perpendicular. An epicyclic reduction gearing of the type shown in FIGS. 5 and 6 and integrating a seventh engine block is housed in the handle 209.

Figure 23:
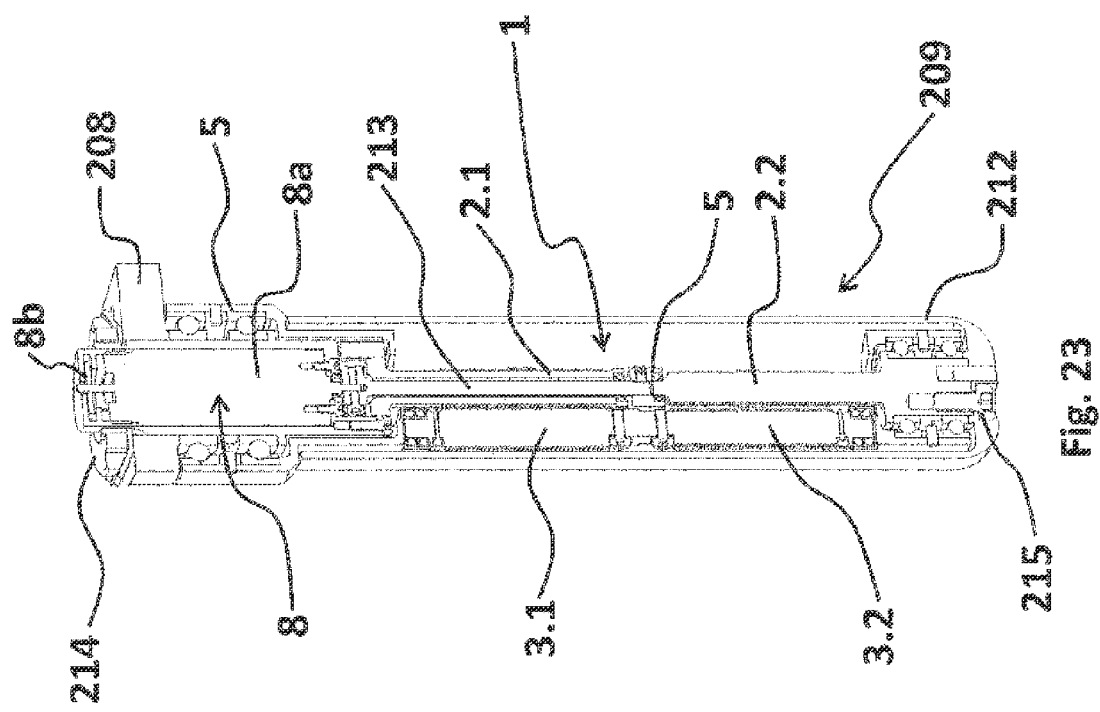
FIG. 23 is a section view of the handle of the robotized arm of FIG. 22, the handle incorporating a transmission device according to the third embodiment.

The handle 209 is more clearly visible on the section view in FIG. 23. The handle comprises a tubular body 212 surrounding the transmission device 1 and forming the output thereof, the input of the transmission device being the handle carrier 208 on which the motor block 8 is fixed, integrating a motor 8a and an angular position sensor 8b.

The transmission device is similar to that of FIGS. 5 and 6.

The sun wheel 2.1 is fixed relative to the handle carrier 208 and serves as a support for the motor block 8, which drives the planet carrier 5 directly via a shaft 213 passing through the sun wheel 2.1. The planet carrier 5 is guided in rotation relative to the base (i.e. sun wheel 2.1) by two angular contact ball bearings which ensure its guidance even in the presence of offset forces generated at the interface of planet wheels 3.1, 3.2 and sun wheels 2.1, 2.2 and/or by the user when he manipulates the handle. Finally, the sun wheel 2.2 is integral with the tubular body 212 of the handle 209 and is guided in rotation on the planet carrier 5 by two angular contact ball bearings, which also ensure its guidance in the presence of offset forces. It is noted that an additional ball bearing could be integrated at the other end of the tubular body 212, so as to ensure its guidance on the planet carrier 5 on the side of the motor block 8. The tension of the ball bearings (which are held remotely using a separate brace) is controlled by a fine-pitched slotted nut 214 on the side of the sun wheel 2.1, and by a generously dimensioned screw 215 on the side of the sun wheel 2.2.

An example of dimensioning is given below purely for information. The sun wheel 2.1 has a diameter of 7.50 mm, sun wheel 2.2 a diameter of 6.72 mm, planet wheel 3.1 a diameter of 8.50 mm and planet wheel 3.2 a diameter of 7.50 mm, which leads to a reduction ratio of (the diameters are given at the neutral fiber of the cables). Associated with a motor with torque capacity of approximately 5.5 mN·m continuously and 16.4 mN·m peak, this device develops maximum torque of 1 N·m approximately, which is ideal for a haptic interface handle.

Here only a single cable strand is provided for the drive between the sun wheel 2.1 and the planet wheel 3.1, and a single cable strand provides the drive between the sun wheel 2.2 and the planet wheel 3.2. The diameter of the cable used is here 0.56 mm. A first cable strand is inserted at one of its ends in a hole in the planet wheel 3.1 and is fixed by a knot or by crimping. It is then wound on the planet wheel 3.1, then passes over the sun wheel 2.1. After a sufficient number of turns to ensure good adhesion, it passes back over the planet wheel 3.1 on which it is wound before being fixed at its other end, for example by using a pressure screw and washer. The principle is the same on sun wheel 2.2 and planet wheel 3.2. It is noted that the number of winding turns on the sun wheels must also be compatible with the pitch of the different pulleys. Here the pitch is 0.67 mm on sun wheel 2.1 and planet wheel 3.2, 0.60 mm on sun wheel 2.2, and 0.76 mm on planet wheel 3.1. Under these conditions, the cable makes around eight turns on the sun wheels so that the length of the seven free threads opposite the windings is close to the length of the eight winding turns. The number of winding turns is therefore higher than the number which is strictly necessary to ensure adhesion of the cable to the sun wheels and which is typically five or six turns. As the pitch of the pulleys is low, this does not however lead to a significant increase in the length of the device, which remains compact.

Figure 24:
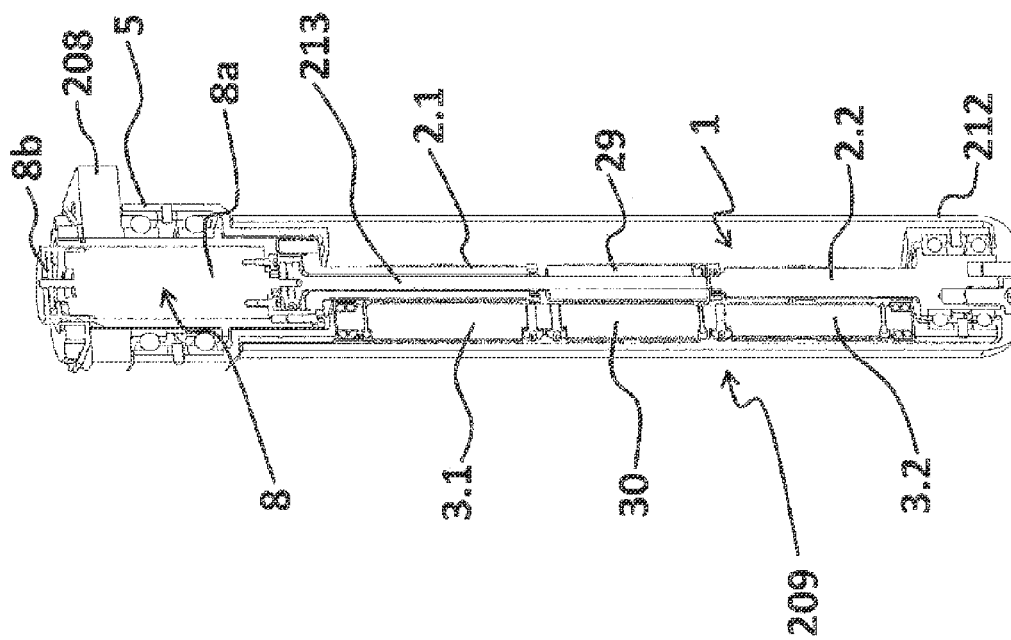
FIG. 24 is a section view of the handle of the robotized arm in FIG. 22, the handle incorporating a transmission device according to a variant embodiment.

FIG. 24 illustrates a variant embodiment of the handle in FIG. 23.

In this variant, the motor 8 is used to drive not the planet carrier 5 but the planet wheels 3.1 and 3.2 directly. For this an additional primary pulley 29 is fixed in rotation on shaft 213, itself fixed to the motor shaft. It drives planet wheels 3.1, 3.2 in rotation via a supplementary pulley 30 inserted between planet wheels 3.1, 3.2 and fixed with planet wheels 3.1, 3.2 in rotation. The reduction ratio is here 1 (the planet wheels turn at the same speed as the motor, here in the opposite direction) but could be different (the planet wheels could also turn in the same direction as the motor with an uncrossed cable winding). Apart from that, the function is similar to that described in relation to FIG. 23, the reduction ratio however being different because the planet carrier 5 is not necessarily turning at the same speed as the planet wheels.

It is understood that the transmission devices according to this variant embodiment of the invention could also be used on all or part of the other axes of the robot in FIG. 22, and on all or part of the axes of the robots in FIGS. 20 and 21.

FIGS. 25 and 26 depict a transmission device according to a first embodiment in which cables 6a, 6b have been replaced by belts 7a, 7b.

Belts 7a, 7b do not advance on the pulleys (pulley 10, pulleys 9 of the planet carrier, sun wheels 2.1, 2.2 and planet wheels 3.1, 3.2), so the device is much more compact. For greater clarity of these figures, the pulleys are shown smooth but it is possible or even advantageous to use profiled and/or notched belts and pulleys having a negative imprint of the belts.

Naturally the invention is not limited to the embodiments described but includes any variant falling within the field of the invention as defined by the claims.

Although for greater simplicity of the figures, the pivot connections are shown by an axis (or shaft) and a bore with little play, it is understood in particular that, in practice, this function is performed by the necessary guidance elements, such as for example and non-exhaustively, straight or angular ball bearings, roller bearings, needle roller bearings, thrust or roller ball bearings or plain bearings in bronze or polytetrafluoroethylene. Similarly the parts are machined to ensure the support of the guidance elements in rotation and translation. These solutions are known to the person skilled in the art and are not described in detail.

It is naturally also understood that the orientation of the rotation axes as shown on the figures is in no case limitative, the axes shown as vertical could be horizontal and vice versa depending on the arrangement of the structure, or inclined by a certain angle.

Also the means for measuring movements of the device and/or haptic interfaces, robots and cobots containing it are not necessarily integrated on or only on the motors as described above. Thus these sensors, which could be of any suitable type such as for example and non-exhaustively optical encoders, Hall effect sensors or magneto-optic sensors, could be placed on the motors, on the articulations or be remote. They could also be used as means for detection of motion and measurement of the angular position of the output sun wheel in relation to the support frame, of the motor in relation to the support frame, or of certain segments in relation to others. They could also be duplicated by placing for example one sensor on the motor and another sensor on the articulation. This redundancy brings greater reliability of the device.

The motor itself can be of any type, in particular a direct current electric motor, a brushless motor, an auto-controlled synchronous motor, an asynchronous motor, a piezoelectric actuator, an actuator based on alloys with form memory, or also a thermal, pneumatic or hydraulic actuator. On a haptic interface or a cobot, a braking device could also be used to oppose and guide the movements of the user, in particular a magnetic brake, powder brake or a device using magneto-rheological or electro-rheological fluids. Motors could also be combined with brakes on the different axes of the robot. This type of association is known to the person skilled in the art and will not be described here. Several motors, for example two, could also be used at the input to a transmission device according to the present invention, these motors then being controlled in coordinated fashion, reproducing for example an agonistic and antagonistic behavior following a bio-inspired approach with two motors of similar capacity. Two motors of different sizes can also be used to implement a macro-micro type command. The actuators could also be associated with flexible elements, for example and non-exhaustively in series or in parallel, according to a structure of the "Series elastic actuators" or "Parallel elastic actuators" type. All these devices are known to the person skilled in the art and will not be described in detail here.

The cables may also be made for example and non-exhaustively of steel, aramide, Kevlar, of the "dyneema" or "micro-dyneema" type, of polypropylene or any other material able to offer the desired mechanical strength for such a device. They may be formed by an assembly of strands, the strands themselves being wound around a core.

Finally, the terminal element of the interface, robot or cobot may assume several forms. On a haptic interface, it generally takes the form of a handle held by the user. This handle may for example and non-exhaustively be a pen, a brush sleeve for example of the joystick type, a ball, pincer etc., depending on the proposed applications which could include games, simulation devices in particular for assembly, maintenance or training in technical fields or at the work station, remote manipulation, remote operation or remote movement, for example in the nuclear domain, the aerospace domain or medical domain. On a robot, they generally take the form of a grasping means, such as for example a pincer with two or more jaws, or a suction cup. This could be a dextrous grasping tool, a wide variety of which exist and are well known to the person skilled in the art. Finally in the case of a cobot, it could for example take the form of an association of a manipulation handle and a grasping tool or an active or inactive tool.

Finally, it is understood that although the device according to the present invention is reversible and has a good efficiency, it may be associated with one or more force sensors mounted for example and non-exhaustively at the output from each motor, at the articulations of the robot or at the end thereof at the terminal element, the additional force signals being used in conjunction with the position signals to control the robot.

As a variant, the transmission device of the invention may comprise a second reduction gearing in series with the first. The second reduction gearing is for example an epicyclic reduction gearing.

As a further variant:
the planet carrier may serve as a support for the motor;
the planet wheels may be linked to the planet carrier by a pivoting shaft connected to the motor, so as to be driven in rotation thereby;
each cable comprises two wound end portions fixed respectively on the sun wheel and the planet wheel;
different diameters of sun wheels and planet wheels may be used, the sum of the radii of the first sun wheel and the first planet wheel being preferably substantially equal to the sum of the radii of the second sun wheel and the second planet wheel;
the external grooves may have a triangular, trapezoidal profile, or a flattened or unflattened U shape;
the pulleys may be mounted or not on supports which can be adjusted between a position close to the contiguous pulley, allowing the cable to leave or rejoin the pulleys by extending tangentially to these, and a position remote from the contiguous pulley to facilitate mounting.

It is also understood that the devices of FIGS. 20 to 22 are given merely as examples. Thus one or more transmission devices according to the present invention could be used, for example and non-exhaustively, on any type of robot, cobot and haptic interface with series architecture with three or six actuated degrees of freedom; on any type of robot, cobot and haptic interface with mixed architecture with six actuated degrees of freedom, using for example two branches produced with a pivot and a parallelogram and an axis in series; on any type of robot, cobot and haptic interface with parallel architecture with six actuated degrees of freedom, using for example three branches each with two or three motors; on exoskeletons of legs, trunk, arms and hands; or on humanoid robots, in particular their arms, legs and hands.

The invention claimed is:

1. A device for transmitting motion between a motor and a mobile element, comprising an epicyclic reduction gearing with a first sun wheel and a second sun wheel, coaxial to each other and connected by transmission means to at least one first planet wheel and a second planet wheel respectively, which are carried coaxially to each other by a planet carrier mounted to pivot eccentrically around the axis of the sun wheels, characterized in that the transmission means comprise flexible transmission elements wound respectively around the first sun wheel and the first planet wheel, and around the second sun wheel and the second planet wheel.

2. The device as claimed in claim 1, wherein the flexible transmission elements are cables each with at least one portion wound around the sun wheel and one portion wound around the planet wheel.

3. The device as claimed in claim 2, wherein the sun wheels and/or planet wheels comprise an external helicoidal groove to receive the wound cable portion.

4. The device as claimed in claim 3, wherein the external helicoidal grooves of the planet wheels have opposing directions.

5. The device as claimed in claim 2, wherein each cable comprises two end portions wound around and fixed to the sun wheels, and a central portion wound around the planet wheel.

6. The device as claimed in claim 5, comprising a tensioner of at least one of the wound and fixed end portions.

7. The device as claimed in claim 6, wherein the wound and fixed end portion is connected directly to the tensioner.

8. The device as claimed in claim 7, wherein the tensioner comprises a yoke and a rod for attachment of the end portion, the yoke having an oblong orifice for passage of a screw to fix the yoke to the element around which the end portion is wound and fixed, the orifice having longitudinal edges forming a portion of increasing height along a longitudinal direction of the orifice for the screw head, the span having a low part on the side of the end portion and a high part opposite this.

9. The device as claimed in claim 6, wherein the tensioner comprises an element for adjusting of an angular position of the element on which the end portion of the cable is wound and fixed.

10. The device as claimed in claim 2, wherein each cable comprises two strands, of which the two end portions are wound around and fixed respectively to the sun wheel and planet wheel.

11. The device as claimed in claim 2, wherein the planet carrier also carries at least one idler pulley for maintaining a winding angle of the cable around at least one planet wheel.

12. The device as claimed in claim 2, wherein each sun wheel is linked to the corresponding planet wheel by two cables, each with two strands, fixed to the sun wheel and planet wheel so as to each transmit motion in one direction.

13. The device as claimed in claim 2, comprising means for temporarily blocking the rotation of at least one of the sun wheels and planet wheels.

14. The device as claimed in claim 1, wherein the flexible transmission elements are belts.

15. The device as claimed in claim 1, wherein the mobile element is mounted to slide in translation and is linked to an output of the epicyclic reduction gearing by a device transforming rotational motion into translation.

16. The device as claimed in claim 15, wherein said device transforming rotational motion into translation is a rack-and-pinion connection.

17. The device as claimed in claim 16, wherein the rack-and-pinion connection comprises a cable having at least one end portion fixed to the mobile element and a portion wound around an output pinion of the epicyclic reduction gearing.

18. The device as claimed in claim 1, wherein the epicyclic reduction gearing is of the planetary type with external drives.

19. The device as claimed in claim 1, wherein the first sun wheel is fixed and the second sun wheel is pivoting.

20. The device as claimed in claim 19, wherein the first sun wheel serves as a base for fixing and support of the motor.

21. The device as claimed in claim 19, wherein the planet carrier serves as a support for the motor.

22. The device as claimed in claim 19, wherein the planet carrier is linked to the motor to be driven in rotation thereby around the axis of the sun wheels.

23. The device as claimed in claim 22, wherein the planet carrier is integral with a pulley connected to another pulley which is integral with a shaft of the motor by an additional flexible transmission element.

24. The device as claimed in claim 23, wherein the motor is mounted on a support which is adjustable in its position in relation to the planet carrier pulley.

25. The device as claimed in claim 23, wherein the planet wheels are arranged in the pulley of the planet carrier.

26. The device as claimed in claim 19, wherein the planet wheels are linked to the planet carrier by a pivoting shaft linked to the motor so it can be driven in rotation thereby.

27. The device as claimed in claim 19, wherein the planet carrier is integral with an output shaft of the motor.

28. The device as claimed in claim 19, wherein the motor is carried by a support and the planet carrier is arranged laterally in relation to the support.

29. The device as claimed in claim 19, wherein the planet wheels are arranged laterally in relation to the planet carrier.

30. The device as claimed in claim 19, wherein the epicyclic reduction gearing comprises a plurality of first planet wheels and second planet wheels mounted on the planet carrier symmetrically around the axis of the sun wheels.

31. The device as claimed in claim 19, wherein the planet wheels have substantially identical diameters.

32. The device as claimed in claim 19, wherein the sum of the radii of the first sun wheel and the first planet wheel is substantially equal to the sum of the radii of the second sun wheel and the second planet wheel.

33. The device as claimed in claim 1, comprising a second reduction gearing in series with the epicyclic reduction gearing.

34. The device as claimed in claim 33, wherein the second reduction gearing is an epicyclic reduction gearing.

35. The epicyclic reduction gearing for the device as claimed in claim 1.

36. A manipulation arm comprising at least one first segment and one second segment linked together by an articulation, and the device for transmitting motion as claimed in claim 1, mounted between the two segments so as to move the second segment in relation to the first segment.

37. The manipulation arm according to claim 36, wherein the second segment is a grasping handle and the epicyclic reduction gearing is housed in said handle.

38. A device for transmitting motion between a motor and a mobile element, comprising an epicyclic reduction gearing with a first sun wheel and a second sun wheel, coaxial to each other and connected by flexible transmission elements to at least one first planet wheel and a second planet wheel respectively, which are carried coaxially to each other by a planet carrier mounted to pivot eccentrically around the axis of the sun wheels, wherein the flexible transmission elements are respectively wound around the first sun wheel and the first planet wheel, and around the second sun wheel and the second planet wheel.

* * * * *